US008763623B2

(12) United States Patent
Hartman et al.

(10) Patent No.: US 8,763,623 B2
(45) Date of Patent: Jul. 1, 2014

(54) METHODS FOR HANDLING SOLIDS IN MICROFLUIDIC SYSTEMS

(75) Inventors: Ryan L. Hartman, Northport, AL (US); John R. Naber, Somerville, MA (US); Nikolay Zaborenko, Indianapolis, IN (US); Jonathan P. McMullen, Somerville, MA (US); Klavs F. Jensen, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 644 days.

(21) Appl. No.: 12/940,816

(22) Filed: Nov. 5, 2010

(65) Prior Publication Data

US 2011/0126914 A1 Jun. 2, 2011

Related U.S. Application Data

(60) Provisional application No. 61/258,767, filed on Nov. 6, 2009.

(51) Int. Cl.
*F17D 1/16* (2006.01)
(52) U.S. Cl.
USPC .............................. 137/13; 137/806; 137/807
(58) Field of Classification Search
USPC ............. 137/13, 806, 807, 833; 422/502, 504
See application file for complete search history.

(56) References Cited

U.S. PATENT DOCUMENTS

| 685,738 | A | 11/1901 | Bright |
| 3,715,104 | A | 2/1973 | Cottell |
| 4,764,021 | A | 8/1988 | Eppes |
| 5,032,027 | A | 7/1991 | Berliner, III |
| 5,354,910 | A | 10/1994 | Hung et al. |
| 5,629,185 | A | 5/1997 | Stanzl et al. |
| 6,192,768 | B1 | 2/2001 | Wallman et al. |
| 6,268,442 | B1 | 7/2001 | Gustafsson et al. |
| 6,270,903 | B1 | 8/2001 | Feng et al. |
| 6,277,641 | B1 * | 8/2001 | Yager .............................. 436/52 |
| 6,506,584 | B1 | 1/2003 | Chandler et al. |
| 6,669,831 | B2 * | 12/2003 | Chow et al. ................... 137/804 |
| 6,777,245 | B2 | 8/2004 | Wixforth |
| 6,854,338 | B2 | 2/2005 | Khuri-Yakub et al. |
| 6,880,576 | B2 * | 4/2005 | Karp et al. ..................... 137/806 |
| 6,929,750 | B2 | 8/2005 | Laurell et al. |
| 6,955,738 | B2 | 10/2005 | Derand et al. |
| 7,077,175 | B2 | 7/2006 | Yin et al. |

(Continued)

FOREIGN PATENT DOCUMENTS

DE 10055318 A1 12/2001
WO WO 03/020414 A1 3/2003

(Continued)

OTHER PUBLICATIONS

International Search Report and Written Opinion for PCT/US2010/055649 mailed Sep. 8, 2011.

(Continued)

*Primary Examiner* — Kevin Lee
(74) *Attorney, Agent, or Firm* — Wolf, Greenfield & Sacks, P.C.

(57) ABSTRACT

Systems and methods related to handling solids in microfluidic systems are generally described. Many of the systems and methods described herein address the need to inhibit the formation of blockages in microfluidic channels.

26 Claims, 12 Drawing Sheets

(56) References Cited

U.S. PATENT DOCUMENTS

| | | | |
|---|---|---|---|
| 7,182,552 | B2 | 2/2007 | Takagi et al. |
| 7,267,778 | B2 | 9/2007 | de Meulenaer et al. |
| 7,507,387 | B2 | 3/2009 | Mae et al. |
| 7,514,009 | B2 | 4/2009 | Swinnen et al. |
| 7,563,932 | B2 | 7/2009 | Coggan et al. |
| 2004/0069708 | A1 | 4/2004 | Laurell et al. |
| 2004/0069717 | A1 | 4/2004 | Laurell et al. |
| 2004/0241865 | A1 | 12/2004 | Gabski et al. |
| 2005/0016851 | A1* | 1/2005 | Jensen et al. ............ 204/471 |
| 2005/0029440 | A1 | 2/2005 | Laurell et al. |
| 2005/0032202 | A1 | 2/2005 | Laurell et al. |
| 2005/0042769 | A1 | 2/2005 | Laurell et al. |
| 2005/0048568 | A1 | 3/2005 | Laurell et al. |
| 2005/0106064 | A1 | 5/2005 | Laurell et al. |
| 2005/0129580 | A1 | 6/2005 | Swinehart et al. |
| 2006/0034735 | A1 | 2/2006 | Miura et al. |
| 2006/0078473 | A1 | 4/2006 | Murakami |
| 2006/0241242 | A1 | 10/2006 | Devlin et al. |
| 2006/0275883 | A1 | 12/2006 | Rathgeber et al. |
| 2007/0141616 | A1 | 6/2007 | Sudo |
| 2008/0073545 | A1 | 3/2008 | Akashi et al. |
| 2009/0098027 | A1 | 4/2009 | Tabata et al. |
| 2009/0118545 | A1 | 5/2009 | Coggan et al. |
| 2009/0226994 | A1 | 9/2009 | Lemor et al. |
| 2009/0252658 | A1 | 10/2009 | Ramler et al. |
| 2010/0294986 | A1 | 11/2010 | Sultana et al. |
| 2010/0298602 | A1 | 11/2010 | Sultana et al. |

FOREIGN PATENT DOCUMENTS

| | | |
|---|---|---|
| WO | WO 2007/038976 A1 | 4/2007 |
| WO | WO 2009/023515 A2 | 2/2009 |
| WO | WO 2011/023236 A1 | 3/2011 |
| WO | WO 2011/057091 A2 | 5/2011 |

OTHER PUBLICATIONS

Invitation to Pay Additional Fees received in PCT/US2010/055649 mailed Jul. 1, 2011.

Abate et al., "Photoreactive coating for high-contrast spatial patterning of microfluidic device wettability," *Lab Chip*, vol. 8 (2008) 2157-2160.

Abate, A. R., et al., "Glass coating for PDMS microfluidic channels by sol-gel methods," *Lab Chip*, 2008, 8, 516-518.

Ahmed-Omer et al., "Biphasic reactions in microreactors," *Multi-Material Micro Manufacture*, (2008) p. 1-3.

Angell et al., "Silicon micromechanical devices," *Scientific American*, vol. 248, No. 4 (Apr. 1983) p. 44-55.

Bengtsson et al., "Ultrasonic agitation in microchannels," *Analytical and Bioanalytical Chemistry*, 2004. 378(7): p. 1716-1721.

Bhagat et al., "Continuous particle separation in spiral microchannels using dean flows and differential migration," *Lab Chip*, vol. 8 (2008) p. 1906-1914.

Biscoe, et al, "A New Class of Easily Activated Palladium Precatalysts for Facile C—N Cross-Coupling Reactions and the Low Temperature Oxidative Addition of Aryl Chlorides," *J. Am. Chem. Soc.* 2008, 130, 6686-6687.

Carey, J. S., "Analysis of the reactions used for the preparation of drug candidate molecules," *Org. Biomol. Chem*, 2006, 4, 2337-2347.

Castell et al., "Liquid-liquid phase separation: characterisation of a novel device capable of separating particle carrying multiphase flows," *Lab Chip*, vol. 9, (2009) p. 388-396.

Coakley, "Ultrasonic separations in analytical biotechnology," *TIBTECH*, vol. 15 (Dec. 1997) p. 506-511.

Conant, et al., "Wall coating behavior of catalyst slurries in non-porous ceramic microstructures," *Chem. Eng. Sci.*, 2006, 61, 5678-5685.

Datta et al., "Microfabrication and characterization of Teflon AF-coated liquid core waveguide channels in silicon," *IEEE Sensors Journal*, vol. 3, No. 6 (Dec. 2003) p. 788-795.

Di Carlo et al., "Continuous inertial focusing, ordering, and separation of particles in microchannels," *PNAS*, vol. 104, No. 48 (Nov. 27, 2007) p. 18892-18897.

Duffy et al., "Rapid Prototyping of microfluidic systems in poly(dimethylsiloxane)," *Analytical Chemistry*, vol. 70, No. 23 (Dec. 1, 1998) p. 4974-4984.

Dugger, et al. "Survey of GMP Bulk Reactions Run in a Research Facility between 1985 and 2002," *Org. Process Res. Dev.* 2005, 9, 253-258.

Evander et al., "Noninvasive acoustic cell trapping in a microfluidic perfusion system for online bioassays," *Analytical Chemistry*, 2007. 79(7): p. 2984-2991.

Gedanken, A., "Using sonochemistry for the fabrication of nanomaterials," *Ultrason. Sonochem.* 2004, 11, 47-55.

Goodell, et al, "Development of an Automated Microfluidic Reaction Platform for Multidimensional Screening: Reaction Discovery Employing Bicyclo[3.2.1]octanoid Scaffolds," *Journal of Organic Chemistry*, 2009, 74, 6169-6180.

Green et al., "Effect of channel geometry on cell adhesion in microfluidic devices," *Lab Chip*, vol. 9 (2009) p. 677-685.

Grover et al., "Teflon films for chemicall-inert microfluidic valves and pumps," *Lab Chip*, vol. 8 (2008) p. 913-918,.

Gunther, A., et al., "Multiphase microfluidics: from flow characteristics to materials and chemical synthesis," *Lab Chip*, 2006, 6, 1487-1503.

Harris et al., "A silicon microfluidic ultrasonic separator," *Sensors and Actuators*, (2003) p. 425-434.

Hartman, et al., "Overcoming the Challenges of Solid Bridging and Constriction during Pd-Catalyzed C-N Bond Formation in Microreactors," *Organic Process Research & Development* (2010) 14, pp. 1347-1357.

Hartman, et al., "Microchemical systems for continuous-flow synthesis," *Lab Chip* 2009, 9, 2495-2507.

Hartman, et al., "Handling solids in microreactors for continuous-flow synthetic chemistry," Abstract for AIChE 2009 Annual Meeting, available online Apr. 28, 2009.

Hawkes et al., "Continuous cell washing and mixing driven by an ultrasound standing wave within a microfluidic channel," *Lab Chip*, vol. 14 (2004) p. 446-452.

Horie et al., "Photodimerization of maleic anhydride in a microreactor without clogging," *Organic Process Research & Development*, 2010, 14, 405-410.

Huang et al., "Continuous particle separation through deterministic lateral displacement," *Science*, vol. 304 (May 14, 2004) p. 987-990.

Khan, et al., "Microfluidic synthesis of titania shells on colloidal silica," *Adv. Mater.* 2007, 19, 2556.

Khan, et al., "Microfluidic Synthesis of Colloidal Silica," *Langmuir*, 2004, 20, 8604-8611.

Koc et al., "Nano-scale superhydrophobicity: suppression of protein adsorption and promotion of flow-induced detachment," *Lab Chip*, vol. 8 (2008) p. 582-586.

Kockmann et al., "Reactive particle precipitation in liquid microchannel flow," *Chemical Engineering Journal*, (2008) p. S110-S116.

Kralj, et al, "Continuous Dielectrophoretic Size-Based Particle Sorting," *Anal. Chem.* 2006, 78, 5019-5025.

Kuhn et al., "Teflon-Coated Silicon Microreactors: Impact on Segmented Liquid-Liquid Multiphase Flows," *Langmuir* (2011) 27, pp. 6519-6527.

Kulkarni, et al, "Two-Phase Flow in Minichannels: Hydrodynamics, Pressure Drop, and Residence Time Distribution," *Ind. Eng. Chem. Res.*, 2009, 48, 8193-8204.

Laurell et al., "Chip integrated strategies for acoustic separation and manipulation of cells and particles," *Chem. Soc. Rev.*, vol. 36 (2007) p. 492-506.

Li, W., et al., "Multi-Step Microfluidic Polymerization Reactions Conducted in Droplets: The Internal Trigger Approach," *J. Am. Chem. Soc.* 2008, 130, 9935-9941.

Lilliehom, T., et al., "Trapping of microparticles in the near field of an ultrasonic transducer." *Ultrasonics*, (2005).43(5): p. 293-303.

Manor et al., "Microfabrication and characterization of liquid core waveguide glass channels coated with Teflon AF," *IEEE Sensors Journal*, vol. 3, No. 6 (Dec. 2003) p. 687-692.

(56) References Cited

OTHER PUBLICATIONS

Mauger, et al., "Successful application of microstructured continuous reactor in the palladium catalysed aromatic amination," *J. Organomet. Chem.* 2005, 690, 3627-3629.

Mukhopadhyay, "When microfluidic devices go bad: How does fouling occur in microfluidic devices, and what can be done about it?" *Analytical Chem.*, (Nov. 1, 2005) p. 429A-432A.

Murphy, et al, "Accelerating Reactions with Microreactors at Elevated Temperatures and Pressures: Profiling Aminocarbonylation Reaction," *Angew. Chem., Int. Ed.* 2007, 46, 1734-1737.

Naber, J.R., et al. "Packed-Bed Reactors for Continuous-Flow CN Cross-Coupling," *Angew. Chem., Int. Ed.*, vol. 122, Issue 49, pp. 9659-9664, Dec. 3, 2010.

Nagasawa, et al, "Development of a New Microreactor Based on Annular Microsegments for Fine Particle Production," *Ind. Eng. Chem. Res.* 2006, 45, 2179-2186.

Nilsson et al., "Acoustic control of suspended particles in microfluidic chips," *Lab Chip*, vol. 4 (2004) p. 131-135.

Noel, et al., "Palladium-catalyzed amination reactions in flow: overcoming the challenges of clogging via acoustic irradiation," *Chemical Science* (2011), 2, pp. 287-290.

Pamme, "Continuous flow separations in microfluidic devices," *Lab Chip*, vol. 7, (2007) p. 1644-1659.

Petersson, F., et al., "Carrier medium exchange through ultrasonic particle switching in microfluidic channels," *Analytical Chemistry*, 2005. 77(5): p. 1216-1221.

Petersson et al., "Continuous separation of lipid particles from erythrocytes by means of laminar flow and acoustic standing wave forces," *Lab Chip*, vol. 5 (2005) p. 20-22.

Petersson et al., "Free flow acoustophoresis: Microfluidic-based mode of particle and cell separation", *Analytical Chem.*, vol. 79, No. 14 (Jul. 15, 2007) p. 5117-5123.

Poe et al., "Solving the clogging problem: Precipitate-forming reactions in flow," *Angew. Chem.. Int. Ed,.* vol. 45 (2006) p. 1544-1548.

Poesio et al., "Formation and ultrasonic removal of fouling particle structures in a natural porous material," *Journal of Petroleum Science and Engineering*, (2004) 45(3-4): p. 159 178.

Popa et al., "Towards Continuous Flow, Highly Enantioselective Allylic Amination: Ligand Design, Optimization and Supporting," *Adv. Synth. Catal.* 2009, 351, 1539-1556.

Ramachandran et al., "Multilayer deposition of stable colloidal particles during flow within cylindrical pores," *Langmuir*, vol. 14 (1998) p. 4435-4444.

Ramachandran et al., "Plugging by hydrodynamic bridging during flow of stable colloidal particles within cylindrical pores," *J. Fluid Mech.*, vol. 385 (1999) p. 125-156.

Roberge, et al, "Microreactor Technology: A Revolution for the Fine Chemical and Pharmaceutical Industries?" *Chem. Eng. Technol.* 2005, 28, 318-323.

Rudel, et al, "Temperature Dependence of Positron Annihilation Lifetimes in High Permeability Polymers: Amorphous Teflons AF," *Macromolecules*, 2008, 41, 788-795.

Sahoo, et. al., "Multistep Continuous-Flow Microchemical Synthesis Involving Multiple Reactions and Separations," *Angew, Chem. Int. Edit.* 2007, 46, 5704-5708.

Sedelmeier et al., "$KMnO_4$—mediated oxidation as a continuous flow process," *Organic Letters*, vol. 12, No. 16 (2010) p. 3618-3621.

Shestopalov, I., et al., "Multi-step synthesis of nanoparticles performed on millisecond time scale in a microfluidic droplet-based system," *Lab Chip* 2004, 4, 316-321.

Shore, et al., "Pd PEPPSI-IPr-Mediated Reactions in Metal-Coated Capillaries Under MACOS: The Synthesis of Indoles by Sequential Aryl Amination/ Heck Coupling," *Chem.A Eur. J.* 2008, 14, 1351-1356.

Song, H., et al., "Reactions in Droplets in Microfluidic Channels," *Angew. Chem. Int. Edit.*, 2006, 45, 7336-7356.

Song, H., et al., "A microfluidics system for controlling reaction networks in time," Angew. Chem.-Int. Edit., 2003, 42, 768-772.

Spengler, et al, "Ultrasound conditioning of suspensions—studies of streaming influence on particle aggregation on a lab- and pilot-plant scale," *Ultrasonics* 2000, 38, 624-628.

Srinivasan et al., "Alkyltrichlorosilane-based self-assembled monolayer films for stiction reduction in silicon micromachines," *J. of Microelectromechanical Systems*, vol. 7, No. 2 (Jun. 1998) p. 252-260.

Sultana, M., "Microfluidic Systems for Continuous Crystallization of Small Organic Molecules," Ph.D. Thesis, Department of Chemical Engineering, MIT, Jun. 30, 2010.

Surry, et al., "Biaryl Phosphane Ligands in Palladium-Catalyzed Amination," *Angew. Chem., Int. Ed.* 2008, 47, 6338-6361.

Takagi, et al., "Production of titania nanoparticles by using a new microreactor assembled with same axle dual pipe" *Chem. Eng. J.* 2004, 101, 269-276.

Teflon Coated Stainless Steel Tubing (accessed Nov. 3, 2009) http://www.nesmalltube.com/services/finishing.html.

Willis et al., "Monolithic Teflon® membrane valves and pumps for harsh chemical and low-termperature use," *Lab Chip*, vol. 7 (2007) p. 1469-1474.

Winterton et al., "A novel continuous microfluidic reactor design for the controlled production of high-quality semiconductor nanocrystals," *J. Nanopart. Res.*, vol. 10 (2008) p. 893-905.

Wolfe et al., "Palladium-catalyzed amination of aryl triflates," *J. Org. Chern.*, vol. 62:5 (1997) p. 1264-1267.

Wolfe et al., "Simple, efficient catalyst system for the palladium-catalyzed amination of aryl chlorides, bromides, and triflates," *J. Org. Chem.*, vol. 65:4 (2000) p. 1158-1174.

Wolfe et al., "Rational development of practical catalysts for aromatic carbon-nitrogen bond formation," *Acc. Chem. Res.*, (1998) 31(12): p. 805-818.

Wu et al., "Fabrication of Pdms-based nitrite sensors using Teflon AF coating microchannels," *IEEE Sensors Journal*, vol. 8, No. 5 (May 2008) p. 465-469.

Wyss et al., "Mechanism for clogging of microchannels," *Phy. Rev.*, vol. 74 (2006) p. 061402-1-061402-6.

Yamada et al., "Hydrodynamic filtration for on-chip particle concentration and classification utilizing microfluidics," *Lab Chip*, vol. 5 (2005) p. 1233-1239.

Yang et al., "Active micromixer for microfluidic systems using lead-zirconate-titanate(PZT)—generated ultrasonic vibration," *Electrophoresis*, vol. 21 (2000) p. 116-119.

Yen, et al., "A Microfabricated Gas-Liquid Segmented Flow Reactor for High-Temperature Synthesis: The Case of CdSe Quantum Dots," *Angew. Chem., Int. Ed.* 2005, 44, 5447-5451.

Zhao, et al, "Transport of organic solutes through amorphous Teflon AF films," *J. Am. Chem. Soc.*, 2005, 127, 15112-15119.

Barge, A.; Tagliapietra, S.; Tei, L.; Cintas, P.; Cravotto, G., "Pd-catalyzed Reactions Promoted by Ultrasound and/or Microwave Irradiation," *Curr. Org. Chem.* 2008, 12, 1588-1612.

Challis, R. E., et al., "Ultrasound techniques for characterizing colloidal dispersions," *Rep. Prog. Phys.* 2005, 68, 1541-1637.

Doms, M., et al., "Hydrophobic coatings for MEMS applications," *Journal of Micromechanics and Microengineering*, 2008, 18, 055030.

Haswell, S. J., et al., "Kumada—Corriu reactions in a pressure-driven microflow reactor," *Lab Chip* 2001, 1, 164-166.

Kuntaegowdanhalli, et al., "Inertial microfluidics for continuous particle separation in spiral microchannels," *Lab Chip* 2009, 9, 2973-2980.

Li, X.M., et al., "What do we need for a superhydrophobic surface? A review on the recent progress in the preparation of superhydrophobic surfaces," *Chem. Soc. Rev.*, 2007, 36, 1350-1368.

Lilliehom et al., "Bioassays on ultrasonically trapped microbead clusters in microfluidic systems," *Micro Total Analysis Systems* 2004, vol. 2:(297) (2004) p. 327-329.

(56) References Cited

OTHER PUBLICATIONS

Mason, T. J., "Ultrasound in synthetic organic chemistry," *Chem. Soc. Rev.* 1997, 26, 443-451.

Oskooei, S. A. K. and D. Sinton, "Partial wetting gas—liquid segmented flow microreactor," *Lab on a Chip,* 2010, 10, 1732-1734.

Resnick, P.R., "The preparation and properties of a new family of amorphous fluoropolymers: Teflon AF," *Journal of Fluorine Chemistry,* 45, Oct. 1989.

Resnick, P.R., "The preparation and properties of a new family of amorphous fluoropolymers—Teflon-AF," Abstr. Pap. Am. Chem. S., 1990, 199, 107.

Watts, et al., "Recent advances in synthetic micro reactions technology," *Chem. Commun.* 2007, 443-467.

Wiles, C.; Watts, P.; Haswell, S. J., "The use of solid-supported reagents for the multi-step synthesis of analytically pure α,β unsaturated compounds in miniaturized flow reactors," *Lab Chip* 2007, 7, 322-330.

* cited by examiner

METHODS FOR HANDLING SOLIDS IN MICROFLUIDIC SYSTEMS

RELATED APPLICATIONS

This application claims the benefit of U.S. Provisional Patent Application Ser. No. 61/258,767, filed Nov. 6, 2009, and entitled "Systems and Methods for Handling Solids in Microfluidic Systems," which is incorporated herein by reference in its entirety for all purposes.

FIELD OF INVENTION

Systems and methods for handling solids in microfluidic systems are generally described.

BACKGROUND

The use of microfluidic systems to perform chemical synthesis and analysis can offer many advantages, relative to systems of larger scale. For example, microfluidic systems can exhibit enhanced heat and mass transfer characteristics, can enable relatively safe synthesis of dangerous compounds, can allow for the isolation of air and moisture sensitive chemistry, can reduce the level of production of waste (hazardous and otherwise), among other advantages. Many chemical synthesis and analysis systems involve the production and/or handling of solids. In many cases, production and/or use of solids in microfluidic systems can lead to partial or full blockage of one or more microfluidic channels, which can render the system non-functional.

SUMMARY OF THE INVENTION

Systems and methods related to handling solids in microfluidic systems are provided. The subject matter of the present invention involves, in some cases, interrelated products, alternative solutions to a particular problem, and/or a plurality of different uses of one or more systems and/or articles.

In one aspect, a method of inhibiting solid accumulation in a microfluidic channel is described. In some embodiments, the method can comprise establishing a flow of a fluid containing a solid in a microfluidic channel, and applying auxiliary acoustic energy to the microfluidic channel at a frequency and level of energy selected to inhibit accumulation of the solid in the microfluidic channel.

In some embodiments, the method can comprise establishing a flow of a fluid containing a solid in a microfluidic channel, and applying auxiliary acoustic energy to the microfluidic channel, wherein the pressure drop along the length of the microfluidic channel in the presence of the auxiliary acoustic energy is less than the pressure drop that would be observed in the absence of the auxiliary acoustic energy, but under otherwise essentially identical conditions.

In some instances, the method can comprise establishing a flow of a core fluid in a microfluidic channel, and establishing a flow of a cladding fluid containing a coating material precursor in the microfluidic channel wherein the cladding fluid at least partially surrounds the core fluid, and the cladding fluid is different from the core fluid. In some embodiments, the method can further comprise transferring at least a portion of the cladding fluid to the core fluid. In some instances, the method can further comprise depositing at least a portion of the coating material precursor on at least a portion of a wall of the microfluidic channel.

In some cases, the method can comprise establishing a flow of a first fluid containing a solid in a first microfluidic channel such that the first fluid is flowing in a first direction, and establishing a flow of a second fluid containing a solvent in a second microfluidic channel. In some embodiments, the second fluid can flow in a second direction substantially parallel to the first direction. In some cases, the first and second microfluidic channels are in fluid communication via a porous structure. In some instances, the method can further comprise contacting the first and second fluids such that the solvent dissolves at least a portion of the solid.

In some embodiments, the method can comprise establishing a flow of a solid carrier fluid containing a solid in a microfluidic channel, flowing a first fluid containing a first solvent in which the solid is soluble into the microfluidic channel at a first feed inlet, and flowing a second fluid containing a second solvent in which the solid is soluble into the microfluidic channel at a second feed inlet downstream of the first feed inlet. In some embodiments, each of the first and second solvents dissolves at least a portion of the solid in the microfluidic channel.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
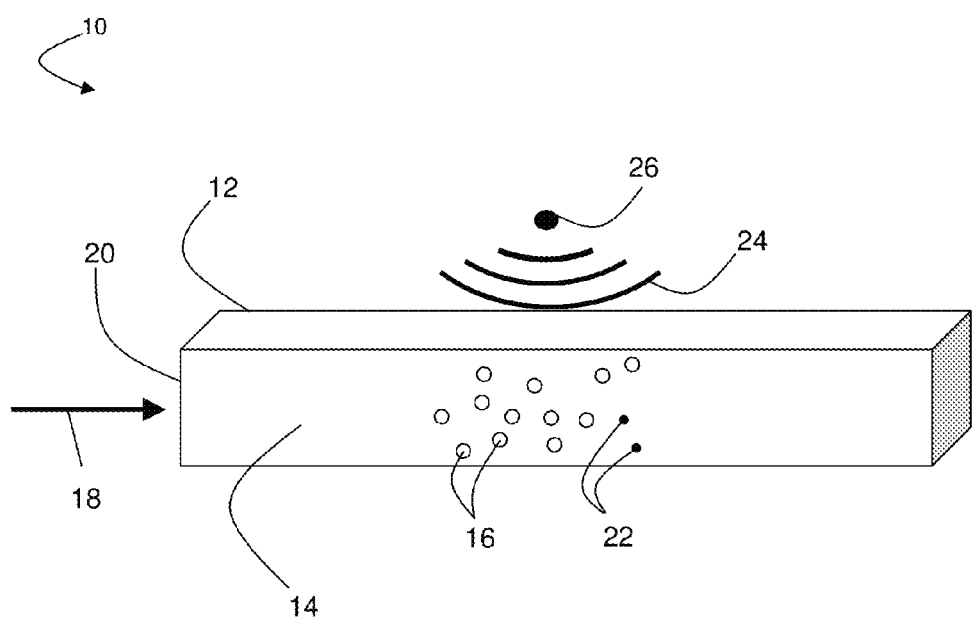
FIG. 1 includes a schematic illustration of a microfluidic system, according to one set of embodiments.

Systems and methods related to handling solids in microfluidic systems are generally described. Many applications require the stable passage and/or generation of solids within a microfluidic channel. For example, some chemical reactions that are advantageous to carry out at the microscale (e.g., due to the formation of an expensive or highly toxic product) may produce a solid material as a product or a by-product. As another example, microfluidic systems can be used in the formation of crystals (e.g., pharmaceutical crystals) or amorphous solids (e.g., titania particles). One challenge in achieving continuous handling of solids in microfluidic systems is the reduction of the irregular and uncontrolled formation and growth of solids and solid agglomerates at the surface of the microfluidic channel. The aggregation of such solids may ultimately lead to clogging of the microfluidic channel.

The embodiments described herein provide tools and related techniques which address the need to prevent the formation of blockages in microfluidic channels in such systems. For example, in one set of embodiments, controlled solids handling may be achieved by applying acoustic energy to the microfluidic channel. In some cases, at least a portion of the wall of the microfluidic channel can be coated with a material that can inhibit the formation, attachment, and/or agglomeration of solid particles on the wall. In addition, clogging of channels can be avoided by the controlled addition of solvents that can act to dissolve at least part of the solid. Controlled addition of one or more precursors of a solid product can also aid in inhibiting solid accumulation in microfluidic channels. In some embodiments, the geometry of the microfluidic channel can be designed such that solid agglomeration is inhibited. The systems and methods described herein may be coupled with electronic control and/ or other automation systems to allow for solids handling without the need for process interruption or shutdown.

The embodiments described herein may be used in a variety of applications that can benefit from the ability to handle solids in microfluidic systems. For example, a large percentage of pharmaceutical products are formulated in solid form (e.g., in crystalline form). Thus, controlled solid formation is an important unit operation in the pharmaceutical industry. In addition, the ability to handle solids can play an important role in the formation of products in the food, pigment, and specialty chemicals industries.

The systems and methods described herein provide several advantages over traditional solids handling methods. The embodiments described herein can be used to inhibit solid accumulation even when the solid particles have a relatively strong affinity for each other and/or the surfaces of the microfluidic channels. Consequently, particles that tend to form aggregates or grow from surfaces can be controllably flowed. In addition, some embodiments can be used to transport solids at relatively high solid fractions.

Other advantages include the ability to operate the systems continuously. Continuous operation allows for high-throughput screening of the effects of various process conditions on solid formation. In continuous solid formation experiments, evaporation rate (e.g., of a solvent, of another fluid, etc.), temperature, pressure, and the like can be easily varied, enabling one to perform multiple experiments using varied process parameters without having to perform each experiment separately, as done for batch systems. In addition, conditions that affect solid formation (e.g., solvent composition, inhibitor composition and/or concentration, enhancer composition and/or concentration, precursor composition and/or concentration, impurity composition and/or concentration, fluid pH, and the like) can be varied by simply changing the flow rate of different feeds, thus facilitating fast screening of the effects of changes in one or more conditions for solid formation. Continuous solid formation also enables the screening of many products (e.g., crystals, etc.) in a short period of time.

In addition, microfluidic systems may include well-defined laminar flow profiles, which allow for the easy determination of flow fields within the channel. The short length scale of the microfluidic channel also allows for better control over conditions for solid formation (e.g., temperature, concentration, contact mode of the reagents, etc.) creating substantially uniform process conditions across the reactor channel in some cases. Moreover, microfluidic systems decrease waste, provide safety advantages, and require only small amounts of reactants, which is beneficial when dealing with expensive materials such as pharmaceutical drugs.

Additional applications and advantages associated with the embodiments described herein are explained in more detail below.

In one aspect, methods for inhibiting solid accumulation in a microfluidic channel are described. Inhibiting solid accumulation may, in some embodiments, involve reducing the amount of solid accumulation in the microfluidic channel relative to an amount of solid accumulation that would be present absent the embodiments described herein. In some instances, inhibiting solid accumulation involves essentially eliminating solid accumulation within the microfluidic channel. As used herein, the phrase "solid accumulation" refers to processes by which solids grow or combine, which can inhibit flow in a microfluidic channel. Solid accumulation in the context of the present invention may primarily occur via non-reactive pathways, to form a solid product that is larger than the components from which the product is formed. Exemplary pathways by which solid accumulation can occur include, but are not limited to, agglomeration, crystallization, amorphous precipitation, and the like. Solid accumulation can occur in microfluidic channels, for example, in the fluid within the channel or at a channel wall.

In one set of embodiments, a flow of a fluid containing a solid is established within a microfluidic channel. For example, FIG. 1 includes a schematic illustration of a device 10 including microfluidic channel 12 in which fluid 14 and solid particles 16 are transported in the direction of arrow 18. In some cases, establishing a flow of a fluid containing a solid comprises feeding a solid to the microfluidic channel (e.g., via an inlet). For example, the solid particles 16 in FIG. 1 may be fed to the microfluidic channel via inlet 20. Establishing a flow of a fluid containing a solid can comprise, in some cases, establishing a flow of a precursor of a solid product in a microfluidic channel, and forming a solid product from the precursor in the microfluidic channel. For example, in FIG. 1, fluid 14 (which can be substantially free of solid particles upon entering channel 14) can contain a precursor of a solid product, and the precursor may be used to form solid particles 22 within the microfluidic channel. In still other embodiments, a flow of a fluid containing a solid may be established by both feeding solids to the microfluidic channel and forming and/or growing solids within the channel from a precursor of a solid product in the microfluidic channel. For example, fluid 14 may contain both solid particles 16 and a precursor to a solid product. The precursor may then be deposited on particles 16 to increase their size and/or form particles 22, which were not present in the fluid upon entry into the microfluidic channel.

A wide variety of solids may be used in the embodiments described herein. The solids may comprise a single crystal material, a polycrystalline material, an amorphous material, or a combination of these. In some embodiments, the solids may comprise a reagent that participates in a chemical reaction within the microfluidic channel. The solids can also comprise products or by-products of a chemical reaction within the microfluidic channel. For example, the solid may comprise a desired organic crystal product produced in a pharmaceutical process. The solid can comprise, in some cases, a product of an organometallic-catalyzed coupling reaction. Examples of such reactions include, for example, carbon-carbon, carbon-nitrogen, carbon-oxygen, and carbon-phosphorous coupling reactions. In some embodiments, the solid may comprise an inorganic reaction product that is insoluble in the fluid within the microfluidic channel. Specific examples can include halide salts such as NaCl, KCl, KI, LiCl, $CuCl_2$, ClF, AgCl, and the like.

In some cases, the solids may comprise a catalyst that participates in a reaction within the microfluidic channel. For example, the solid may comprise a solid organometallic catalyst used, for example, in coupling reactions. Examples of suitable catalysts include, but are not limited to, metal-based catalysts (e.g., copper, palladium, platinum, iron, among others) optionally supported on a porous or non-porous catalyst support (e.g., silica, alumina, a polymer, etc.).

In some embodiments, cells may be used as solids. In some instances, the accumulation of solids within the microfluidic channel can be inhibited without rupturing the cells within the channel.

The solids can include a relatively low amount of polymeric material, in some embodiments. Polymeric materials are understood by those of ordinary skill in the art as including molecules with multiple repeat units of pre-polymer. In some cases, the solids in the microfluidic channel can include less than about 50 wt %, less than about 40 wt %, less than about 25 wt %, less than about 10 wt %, less than about 5 wt %, less than about 1 wt %, or substantially no polymeric material. In one set of embodiments, the solids are primarily free of synthetic polymer, but may include biological polymers such as proteins and protein networks, polysaccharides, polynucleotides, etc.

The solids can be formed from a variety of processes using a variety of precursors. For example, as described above, forming a solid product from a precursor of a solid product can comprise reacting the precursor to form a solid product (e.g., a desirable product, a by-product). In some embodiments, the precursor can be the only reactant that participates in the reaction (e.g., via heating, application of light, application of ultraviolet radiation, or some other stimulus) to produce the solid product. In other cases, the precursor may be reacted with another reactant to produce a solid product.

In some cases, substantially no polymerization occurs in the microfluidic channel. The process of polymerization is understood by those of ordinary skill in the art, and generally refers to a chemical reaction involving a pre-polymer that produces a product with multiple repeat units of pre-polymer, e.g., a longer main chain length relative to the pre-polymer. In some cases, substantially no cross-linking occurs in the microfluidic channel. Cross-linking is also a process that is understood by those of ordinary skill in the art, and generally refers to a chemical reaction in which side chains of two polymers chemically react to form a bond extending from and connecting the polymers.

In some cases, the molecular weight of the solid product remains essentially unchanged once the solid product is formed. For example, in some embodiments, the solid can comprise a pharmaceutical comprising a crystallized protein. In some such embodiments, a chemical reaction may be used to produce a solid protein, and once the solid protein is formed, it undergoes no further changes in its molecular weight.

The solids may also be formed by crystallizing the precursor of a solid product. Crystallizing the precursor can comprise, in some cases, nucleation of the precursor to form solid crystals. "Nucleation" is a term understood by one of ordinary skill in the art, and is generally used to refer to the beginning of the formation of a crystal. Nucleation may involve combination of material (e.g., dissolved crystal precursor) at the molecular scale to form a very small crystal, for example. In some cases, crystallizing the precursor can involve crystal growth. The phrase "crystal growth" would also be understood by one of ordinary skill in the art, and is generally used to refer to the addition of material (e.g., crystal precursor) to a crystal (e.g., a single crystal solid, a crystal lattice within a polycrystalline material, etc.). The additional material may be formed on the crystal such that it at least partially conforms, allowing for crystal defects, to the crystal lattice of the underlying solid. It should be understood that crystals may exist in many forms, including many polymorphs, solvates and hydrates, for a given crystal material. In some cases, forming the solid product from the precursor of a solid product can comprise precipitating the solid precursor to form an amorphous solid.

In some embodiments, acoustic energy is applied to the microfluidic channel. "Acoustic energy" is given its normal meaning in the art, and is generally used to refer to an oscillation of pressure transmitted through a medium. In some embodiments, the acoustic energy can comprise auxiliary acoustic energy. "Auxiliary acoustic energy" generally refers to acoustic energy from a source that is not an inherent source. One of ordinary skill in the art would be able to identify inherent sources of acoustic energy such as, for example, a radio played in a room, an air conditioner emitting fan noise, footsteps, and the like.

For example, in FIG. 1, acoustic energy 24 can be applied to microfluidic channel 12 via acoustic energy source 26. A variety of sources of acoustic energy (e.g., auxiliary acoustic energy) can be employed. The acoustic energy source can, in some instances, be constructed and/or arranged such that it is sufficiently close to the microfluidic channel to inhibit accumulation of the solid within the channel. In some embodiments, the source of acoustic energy may be separated from the device in which the microfluidic channel is located. For example, acoustic energy may originate from a bath in which acoustic energy is generated (e.g., an ultrasonic bath) in some cases. In some embodiments, the acoustic energy can originate from a source that is integrated with the device in which the microfluidic channel is located. For example, the acoustic energy can, in some embodiments, originate from a transducer (e.g., an ultrasonic transducer) formed on the device in which the microfluidic channel is formed (e.g., via MEMS fabrication techniques).

In some embodiments, acoustic energy can be applied to the microfluidic channel at a frequency and/or level of energy selected to inhibit accumulation of the solid in the microfluidic channel. This can be accomplished, for example, by employing a source of acoustic energy that includes a controller that allows for the application of a selected frequency and/or amplitude of acoustic energy. In some embodiments, the acoustic energy within the microfluidic channel can comprise ultrasonic energy (i.e., energy with a frequency of greater than about 20 kHz). In some embodiments, the acoustic energy within the microfluidic channel can comprise a frequency of between about 20 kHz and about 200 GHz, between about 20 kHz and about 1 GHz, between about 20 kHz and about 50 kHz, or between about 30 kHz and about 50 kHz. In some instances, the acoustic energy within the microfluidic channel can comprise a frequency of between about 2 Hz and about 200 GHz, between about 2 Hz and about 1 GHz, between about 2 Hz and about 50 kHz, between about 2 Hz and about 10 kHz, between about 2 Hz and about 1 kHz, between about 2 Hz and about 100 MHz. In some instances, the acoustic energy within the microfluidic channel can comprise a wavelength that is at least about 1 time, at least about 5 times, at least about 10 times, at least about 50 times, at least about 100 times, at least about 1000 times, at least about 10,000 times, between about 1 time and about 100,000 times, between about 1 time and about 10,000 times, between about 1 time and about 1000 times, between about 1 time and about 100 times, between about 1 time and about 10 times, between about 10 times and about 100,000 times, between about 10 times and about 10,000 times, between about 10 times and about 1000 times, between about 100 times and about 100,000 times, between about 100 times and about 10,000 times, or between about 100 times and about 1000 times the maximum cross-sectional dimension of the microfluidic channel.

In some embodiments, the acoustic energy emitted from the source can comprise ultrasonic energy (i.e., energy with a frequency of greater than about 20 kHz). In some embodiments, the acoustic energy emitted from the source can comprise a frequency of between about 20 kHz and about 200 GHz, between about 20 kHz and about 1 GHz, between about 20 kHz and about 50 kHz, or between about 30 kHz and about 50 kHz. In some instances, the acoustic energy emitted from the source can comprise a frequency of between about 2 Hz and about 200 GHz, between about 2 Hz and about 1 GHz, between about 2 Hz and about 50 kHz, between about 2 Hz and about 10 kHz, between about 2 Hz and about 1 kHz, between about 2 Hz and about 100 MHz. In some instances, the acoustic energy emitted from the source can comprise a wavelength that is at least about 1 time, at least about 5 times, at least about 10 times, at least about 50 times, at least about 100 times, at least about 1000 times, at least about 10,000 times, between about 1 time and about 100,000 times, between about 1 time and about 10,000 times, between about 1 time and about 1000 times, between about 1 time and about 100 times, between about 1 time and about 10 times, between about 10 times and about 100,000 times, between about 10 times and about 10,000 times, between about 10 times and about 1000 times, between about 100 times and about 100,000 times, between about 100 times and about 10,000 times, or between about 100 times and about 1000 times the maximum cross-sectional dimension of the microfluidic channel.

The acoustic energy can be applied, in some cases, such that the frequency and/or amplitude within the microfluidic channel are constant over a period of time (e.g., at least about 0.1 seconds, at least about 1 second, at least about 10 seconds, at least about 1 minute, at least about 10 minutes, at least about 1 hour, or between about 0.1 seconds and about 1 hour, between about 0.1 seconds and about 1 minute, or between about 0.1 seconds and about 10 seconds).

In some cases, the frequency and/or amplitude of the acoustic energy within the microfluidic channel can be varied over time. For example, in some embodiments, the application of acoustic energy to the microfluidic channel can comprise the steps of stopping the application of acoustic energy and resuming the application of acoustic energy (e.g., using any of the frequencies, amplitudes, and/or durations outlined above). In some embodiments, the waveform of the acoustic energy can comprise a dual-sinusoid (i.e., every other peak of the waveform is at half-height compared to adjacent peaks). The waveform of the acoustic energy can comprise, in some cases, an amplitude that increases and/or decreases over a period of time. The increase and/or decrease in the amplitude can follow any suitable pattern with respect to time. For example, the acoustic energy can be applied in a such a way that the amplitude increases or decreases exponentially or linearly as a function of time.

The waveform of the acoustic energy can comprise a step function (e.g., a square wave), a sinusoid, or any other suitable waveform. In some embodiments, the waveform of the acoustic energy applied to the microfluidic channel can be formed by combining any two or more of the waveforms described herein, optionally including one or more of the variations in frequency and/or amplitude with respect to time described herein.

In some embodiments, the acoustic energy can be applied such that a ringing effect is achieved. Ringing can be achieved by applying first and second waves (e.g., sinusoidal waves), wherein the frequency of the first wave is different from the frequency of the second wave. The difference in frequencies between the first and second waves, in such embodiments, can produce a ringing effect.

In some embodiments, the pressure drop along the length of the microfluidic channel, while flowing a fluid comprising a solid and/or a solid precursor, in the presence of the acoustic energy is less than the pressure drop that would be observed in the absence of the acoustic energy, but under otherwise essentially identical conditions. Essentially identical conditions, in this context, means conditions that are similar or identical other than the application of acoustic energy. For example, otherwise identical conditions may mean a microfluidic channel, fluid, solids, and precursors that are identical and are operated under identical conditions (e.g., temperature, pressure, etc.), but where no acoustic energy is applied to the microfluidic channel.

In some embodiments, the application of acoustic energy to the microfluidic channel can be accompanied by flowing a second fluid phase within the microfluidic channel. Not wishing to be bound by any theory, the second fluid phase may enhance the inhibition of solid accumulation by interacting with the solid particles to prevent, for example, agglomeration, precipitation, crystal growth, crystal nucleation, and the like. In some cases, the first and second phases may be immiscible with each other. In some embodiments, the second phase may comprise a gas, while the first phase comprises a liquid. In some cases, the first and second phases may both comprise a liquid. In some instances, the second phase may comprise slugs of a fluid contained within the first phase. The term "slug" as used herein, refers to an isolated portion of a first fluid that is surrounded by a second fluid, where the first and second fluids remain separated on the time scale of use of the device of the invention, and the largest cross-sectional dimension of the slug is at least about 50% of the largest cross-sectional dimension of the fluid stream in which the slug is transported. In some embodiments, the largest cross-sectional dimension of the slugs may be comparable to (e.g., at least 80% of, at least 90% of) the largest cross-sectional dimension of the channel through which they are transported. In some instances, the second fluid phase can comprise bubbles. The term "bubble" as used herein, refers to an isolated portion of a first fluid that is surrounded by a second fluid, where the first and second fluids remain largely separate on the time scale of use of the device of the invention, and the largest cross-sectional diameter of the bubble is less than about 50% of the cross-sectional diameter of the fluid in which the bubble is transported. In some cases, bubbling flow comprises an unstable regime in which bubbles of various sizes are produced with little or no control over the number and sizes of the bubbles formed. In some instances, the first and second phases can be fed in concert to the microfluidic channel (e.g., through inlet 20 in FIG. 1). In some embodiments, the second phase may be formed from components within the first phase within microfluidic channel. For example, the second phase can comprise, in some instances, a gas that is generated by degassing a fluid within the microfluidic channel.

In some embodiments, at least a portion of the microfluidic channel can be coated with a coating material that inhibits solid accumulation in the microfluidic channel, relative to an amount of solid accumulation that would be present in the absence of the coating material, but under otherwise essentially identical conditions. In this context, essentially identical conditions means conditions that are similar or identical other than the presence of the coating within the microfluidic channel. For example, otherwise identical conditions may mean a microfluidic channel, fluid, solids, and precursors that are identical and are operated under identical conditions (e.g., temperature, pressure, frequency and/or amplitude of acoustic energy applied, if any, etc.), but where no coating has been applied to the microfluidic channel.

In some embodiments, a coating can be applied to at least a portion of a microfluidic channel using a core-cladding flow arrangement. In this case, the method can comprise establishing a flow of a core fluid in a microfluidic channel, and establishing a flow of a cladding fluid that at least partially surrounds the core fluid. The cladding fluid can contain a coating material precursor which can be deposited on at least a portion of a wall of the microfluidic channel, for example, upon transfer of at least a portion of the cladding fluid to the core fluid. In some embodiments, establishing flows of core and cladding fluids can be accomplished by flowing the core and cladding fluids simultaneously through the inlet of the channel. In some instances, establishing flows of the core and cladding fluids may comprise forming the core or cladding fluids within the microfluidic channel. For example, a liquid containing a dissolved gas can be flowed through the inlet of the microfluidic channel which can be degassed to form a gaseous core fluid surrounded by a liquid cladding fluid. As another example, a gas can be flowed through a microfluidic channel, and a portion of the gas can be condensed to form a liquid cladding fluid that surround the gaseous core fluid.

Figure 2A:
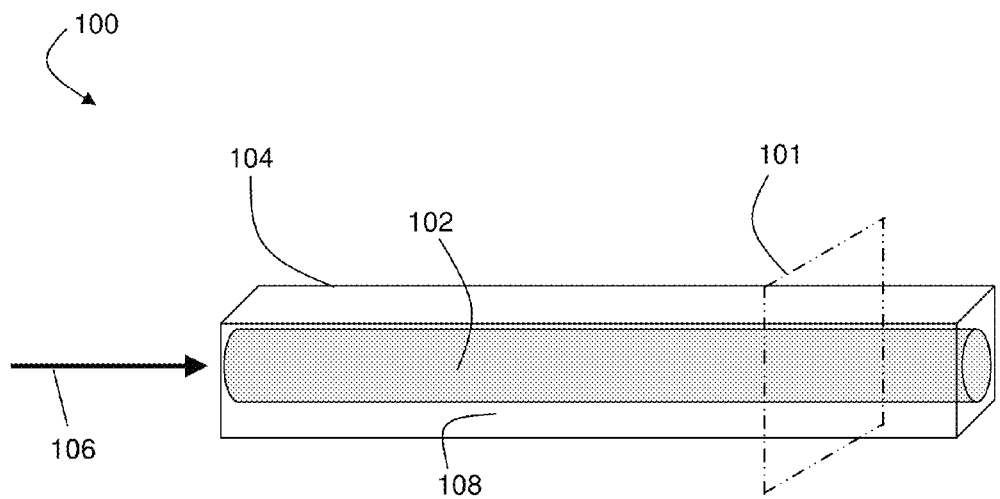
FIGS. 2A-2D include exemplary schematic illustrations of multi-phase microfluidic systems.
Figure 2B:
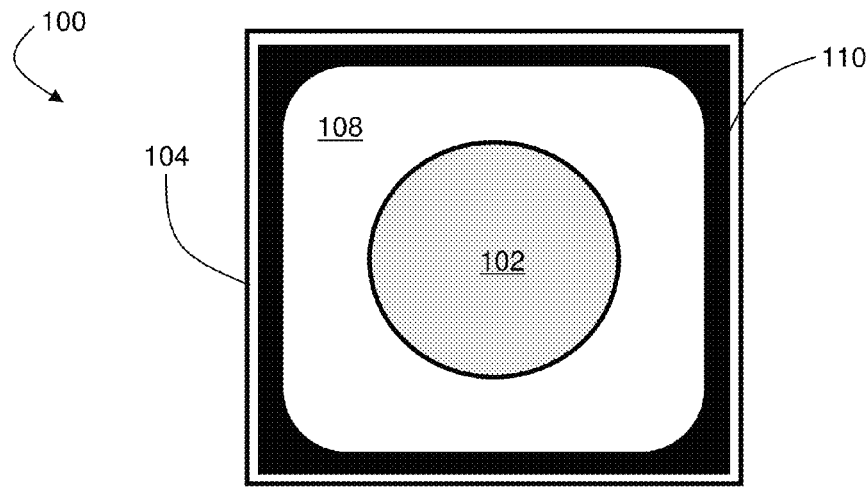
Figure 2C:
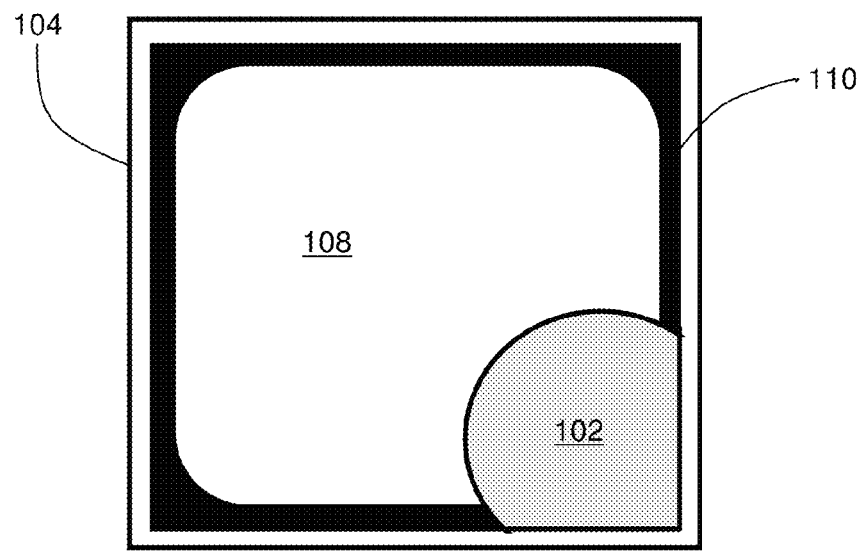
Figure 2D:
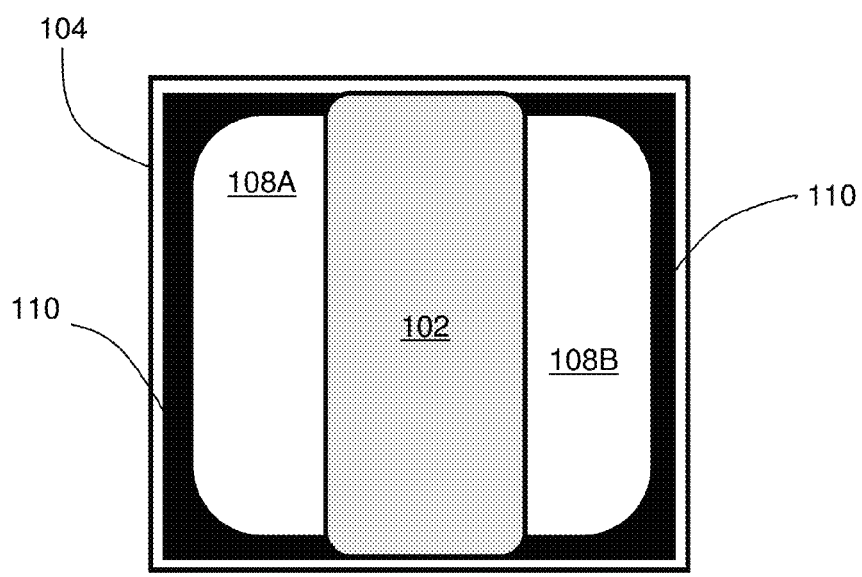

FIG. 2A includes an exemplary schematic illustration of system 100 in which a core-sheath fluid arrangement is employed to produce a coating on a portion of a wall of a microfluidic channel. FIG. 2B includes a schematic cross-sectional view of the schematic in FIG. 2A, as defined by plane 101. In FIGS. 2A-2B, core fluid 102 is transported through microfluidic channel 104 in the direction of arrow 106. In addition, cladding fluid 108 is transported through the microfluidic channel in the direction of arrow 106. While the set of embodiments illustrated in FIGS. 2A-2B shows the cladding fluid completely surrounding a core fluid located in the center of the microfluidic channel, other arrangements are possible. In some cases, the core fluid is only partially surrounded by the cladding fluid. For example, FIG. 2C illustrates an embodiment in which core fluid 102 is located in a corner of the microfluidic channel and is only partially surrounded by cladding fluid 108. In the embodiment illustrated in FIG. 2D, the core fluid spans two surfaces of the microfluidic channel, and is adjacent two separated cladding fluids 108A and 108B.

The cladding fluid (e.g., fluid 108 in FIGS. 2A-2D) can contain a coating material precursor. The coating material precursor may comprise, for example, a reactant that can be reacted on the channel wall to produce a coating (e.g., coating 110 in FIGS. 2B-2D). In some embodiments, the coating material precursor can comprise a solid that is suspended in a fluid (e.g., the cladding fluid) in the microfluidic channel and is deposited on the wall of the microfluidic channel. Any suitable coating material precursor can be used. The coating material precursor can comprise, for example, fluorine (e.g., PTFE, fluoropolymer, fluorosilane), reagents that can be reacted to produce the same (e.g., pre-polymers or polymeric materials), and/or combinations of these.

In some embodiments, at least a portion of the cladding fluid can be transferred to the core fluid, thereby depositing at least a portion of the coating material precursor within the cladding fluid on a wall of the microfluidic channel. For example, in some embodiments, the core fluid comprises a gas and the cladding fluid comprises a liquid. At least a portion of the liquid cladding fluid can be transported to the gaseous core fluid (e.g., via evaporation, boiling, or any other suitable pathway) leaving behind a deposit of coating of the coating material precursor.

Once the coating material precursor has been deposited within the microfluidic channel, the coating material precursor can be transformed to form a coating material, in some embodiments. For example, the coating material precursor can be chemically reacted to produce a coating material in some cases. The chemical reaction can comprise, for example, a polymerization reaction (which can include, in some cases, an activated reaction (e.g., via ultraviolet radiation, heat, visible light, etc.). In some embodiments, transforming the coating material precursor to form a coating material comprises heating the coating material precursor.

A variety of coating materials may be used in association with the systems and methods described herein. In some cases, one or more channel surface portions may be coated with a material that serves to minimize the interactions between the channel surface portion(s) and the solid and/or precursor materials within the channel. In some embodiments, at least a portion of the microfluidic channel can be coated with a hydrophobic material to repel, for example, water-soluble particles. In some instances, at least a portion of a channel may be coated with hydrophilic material which may be useful, for example, in repelling water-insoluble particles. Specific examples of materials that may be useful in coating at least a portion of the microfluidic channel include, but are not limited to fluorine containing compounds (e.g., fluorosilane, fluoropolymers (e.g., Teflon® polymers such as Teflon® AF, Teflon® PTFE, and the like), and the like), silicon dioxide, PDMS, among others. In some embodiments, Teflon® PTFE may be used as a coating material due to its relatively high resistance to chemical degradation.

Not wishing to be bound by any theory, the coating on at least a portion of the microfluidic channel may serve to reduce the level of interaction between channel surfaces and solids and/or precursors of solids. Reducing such interactions may assist in reducing the amount of solid formation and/or accumulation in the channel (e.g., on channel walls), as well as adhesion/interaction of solids on/with the channel walls, thus reducing channel clogging. For example, when solid and/or solid precursors comprise charged particles, the coating material may be selected such that the charged materials are repelled from the channel surface. As a specific example, glycine, which exists in zwitterionic form in solid states, is relatively hydrophilic and is repelled by hydrophobic materials/coatings such as polydimethylsiloxane, or fluorosilane. As another specific example, aspirin, a water-insoluble drug, comprises hydrophobic groups at its crystal planes, and is repelled by hydrophilic materials or coatings such as glass, silicon, and silanes with hydrophilic groups.

The coated channels described herein may possess one or more desirable properties. In some embodiments, the coated microfluidic channels may be capable of withstanding relatively high pressures (e.g., at least about 2 atm, at least about 5 atm, at least about 10 atm, at least about 25 atm, or more) without rupturing. In some cases, a cross-section of the interior surface of the coating within the microfluidic channel (e.g., a coating deposited at least one joint between two interior channel walls) may include only rounded corners. For example, coating 110 illustrated in FIGS. 2B-2D includes rounded corners at each corner of the microfluidic channel in which it is formed. In some cases, the curve traced along a cross sectional view of the interior surface of a coating within the microfluidic channel includes no inflection points. In some instances, this curve tracing analysis is performed while disregarding surface features that are smaller than 100 times, smaller than 1000 times, or smaller than 10,000 times the maximum cross-sectional dimension of the microfluidic channel. In this context, the maximum cross-sectional dimension of a channel represents the longest distance between two walls of a microfluidic channel, as measured in a direction perpendicular to the length of the channel. Such measurements can be accomplished, for example, by visually inspecting a scanning electron microscope (SEM) micrograph of a cross section of the microfluidic channel. Inflection points within a curve are understood by those of ordinary skill in the art, and generally describe a point at which the curve transforms from a concave to a convex state, or vice versa. Generally, sharp corners within the coating can be disadvantageous, in some embodiments, because they form points at which solid particles may accumulate. In some embodiments, the thickness of the coating within the microfluidic channel may vary by no more than about 10%, no more than about 5%, or no more than about 2% of the average thickness of the coating.

In some embodiments, the microfluidic channel (e.g., the microfluidic channel that is at least partially coated) may have micro- or nano-scale structures formed on at least one of its walls. Some examples of such microfluidic structures include, but are not limited to, posts, holes, periodically repeating surface features (e.g., waves), and the like. The micro- or nano-scale structures can have, in some embodiments, maximum cross-sectional dimensions of any suitable size (e.g., less than about 100 microns, less than about 10 microns, less than about 1 micron, less than about 100 nanometers, less than about 10 nanometers, between about 10 nanometers and about 100 microns, between about 10 nanometers and about 10 microns, between about 10 nanometers and about 1 micron, between about 10 nanometers and about 100 nanometers, between about 100 nanometers and about 100 microns, between about 100 nanometers and about 10 microns, between about 100 nanometers and about 1 micron, between about 1 micron and about 100 microns, or between about 1 micron and about 10 microns). One of ordinary skill in the art would understand that the maximum cross-sectional dimension of a structure formed on a channel wall would include the largest distance between two external points on the boundary of the feature, and would generally not extend into the wall of the channel.

In some cases, relatively small microfluidic channels can be coated. For example, in some cases, an at least partially coated microfluidic channel can have a largest cross-sectional dimension of less than about 500 microns, less than about 200 microns, less than about 100 microns, less than about 60 microns, less than about 50 microns, or smaller (e.g., any of the microfluidic channel dimensions described herein).

In some embodiments, solid accumulation can be inhibited by adding one or more solvents to the microfluidic channel selected to partially or fully solvate a solid or precursor to a solid, so as to inhibit solid accumulation, e.g., such that at least a portion of the solid within the channel is dissolved. In some embodiments, the addition of solvent can occur in multiple locations along the microfluidic channel. For example, in some embodiments, a first fluid containing a first solvent in which a solid in the microfluidic channel is at least partially soluble is flowed into the microfluidic channel at a first feed inlet, and at least a portion of the solid in the microfluidic channel is partially or fully dissolved by the first solvent. In addition, a second fluid containing a second solvent in which the solid in the microfluidic channel is at least partially soluble can be flowed into the microfluidic channel at a second feed inlet downstream of the first feed inlet, and at least a portion of the solid in the microfluidic channel can be dissolved by the second solvent.

Any suitable solvent can be used in the embodiments described herein, and one of ordinary skill in the art will be capable of selecting an appropriate solvent for use in a given system. Exemplary solvents can comprise, for example, water, crowned ethers, tris(2-(2-methoxyethoxy)ethyl)amine or a derivative thereof, and the like.

Figure 3A:
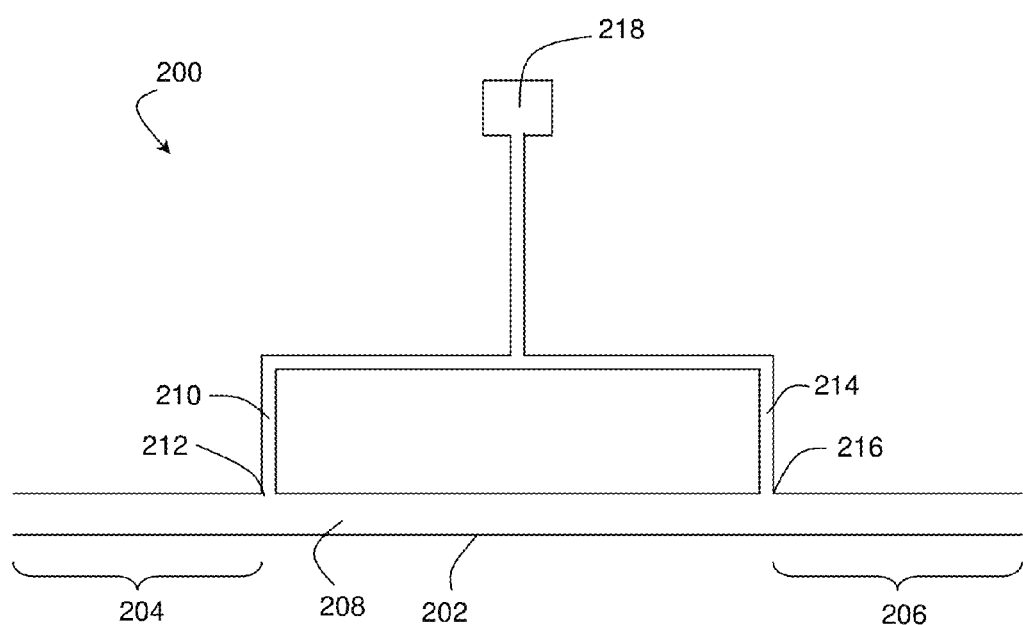
FIGS. 3A-3C include schematic illustrations of exemplary microfluidic systems, according to one set of embodiments.

FIG. 3A includes a schematic illustration of a device 200 that includes multiple solvent inlets, according to one set of embodiments. Device 200 comprises a primary fluidic channel 202 having an upstream portion 204 and a downstream portion 206 wherein a fluid 208 containing a solid flows from the upstream portion to the downstream portion. Device 200 also includes a first channel 210 fluidically connected to the primary fluidic channel at inlet 212, and a second channel 214 fluidically connected to the primary fluidic channel at inlet 216. A first solvent can be added to the microfluidic channel by flowing the first solvent through channel 210 and inlet 212. In addition, a second solvent can be added to the microfluidic channel via channel 214 and inlet 216. While the first and second solvents are shown as being combined with the primary microfluidic channel at T-junctions in FIG. 3A, it should be understood that the interfaces between microfluidic channels may assume any suitable geometry, and one of ordinary skill in the art will be able to select an appropriate geometry for a given application.

Figure 3B:
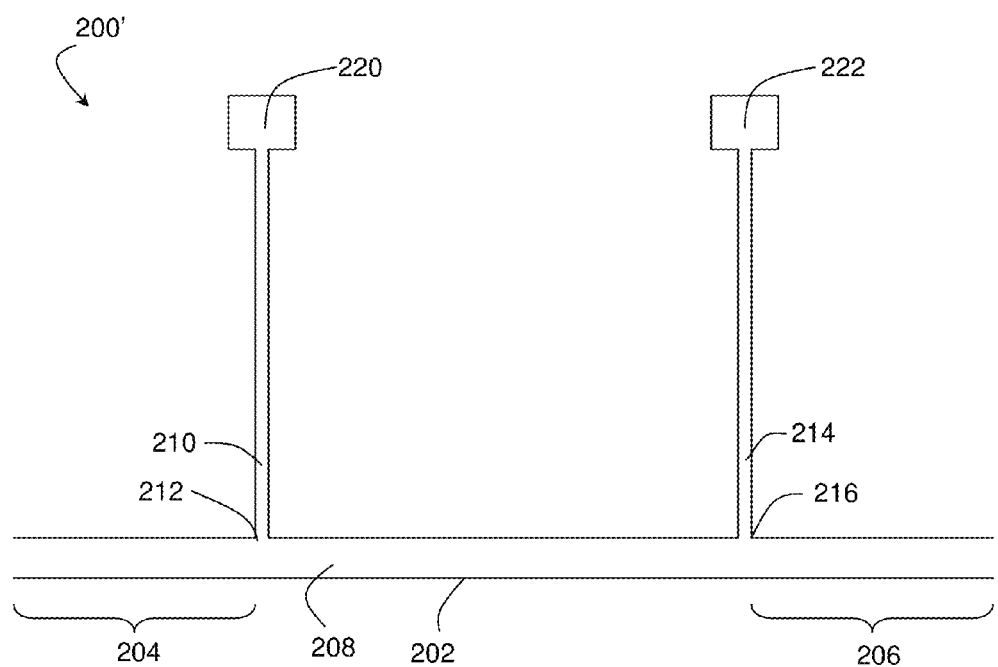

In some cases, the first and second solvents are substantially the same. For example, in the set of embodiments illustrated in FIG. 3A, the solvents flowed through channels 210 and 214 originate from common reservoir 218. This type of arrangement can be beneficial, for example, when a relatively simple system employing a single solvent reservoir is desired. In other cases, the first and second solvents may comprise different concentrations and/or chemical components. For example, FIG. 3B includes a schematic illustration of system 200' in which the solvents originate from separate reservoirs 220 and 222. This type of system may be employed, for example, when it is desirable to provide solvents of different types and/or concentrations at different points along the primary microfluidic channel.

Figure 3C:
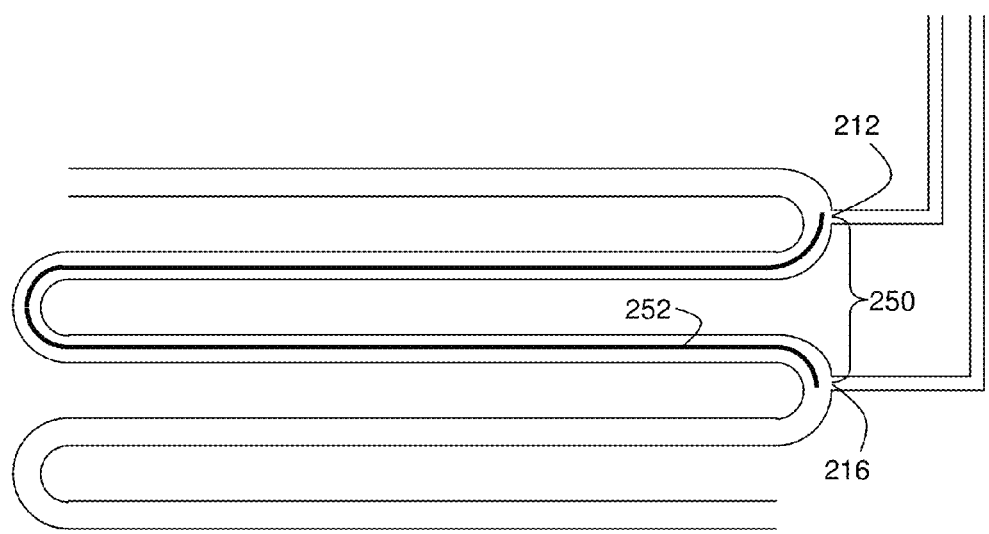

The first solvent inlet (e.g., inlet 212) and the second solvent inlet (e.g., inlet 216) may be spaced apart by any suitable distance, as measured along the length of the primary fluidic channel. For example, in some embodiments the ratio of the distance between the first and second solvent inlets, as measured along the length of the primary channel, and the average cross-sectional dimension of the primary microfluidic channel between the first and second feed inlets is at least about 1:1, 2:1, 3:1, 5:1, 10:1, 25:1, 50:1, 100:1, or greater. It should be noted that the distance as measured along the length of the channel is not necessarily equivalent to the absolute distance between the solvent inlets. For example, when multiple feed inlets are positioned along a serpentine channel, the feed inlets may be positioned on subsequent turns of the channel, as illustrated by inlets 212 and 216 in FIG. 3C. Although the absolute distance between the two feed inlets is relatively short (indicated by dimension 250 in FIG. 3C), the second feed inlet is positioned a distance along the length of the channel on the order of two passes (indicated by line 252 in FIG. 3C).

In some embodiments, devices may include third, fourth, fifth, or more channels connected to the primary fluidic channel via third, fourth, fifth, or more solvent inlets to the primary fluidic channel. These additional channels may be spaced in any suitable fashion. For example, in some embodiments, the channels may be evenly spaced along the length of the primary fluidic channel. In some instances, the spacing between the channels may increase or decrease along the length of the primary fluidic channel. Additional channels connected to the primary fluidic channel may contain the same or different solvent than those contained in the first and/or second channels.

The use of multiple feed inlets may allow for control over the concentration of solids within the primary fluidic channel. For example, in some embodiments, the concentration of the solid within the primary microfluidic channel is maintained between about 0.01 vol % and about 10 vol %, or between about 0.01 vol % and about 1 vol %.

In some embodiments, rather or in addition to adding solvent to a fluid containing a solid via multiple microfluidic channel inlets, controlled addition of solvent can be achieved using porous structures. For example, in some embodiments, a method of inhibiting solid accumulation comprises establishing a flow of a first fluid containing a solid in a first microfluidic channel. In addition, the method can comprise establishing a flow of a second fluid containing a solvent in a second microfluidic channel, wherein the first and second microfluidic channels are in fluid communication via a porous structure. In some embodiments, the first and second fluids are flowed in substantially parallel directions (e.g., co-currently in substantially the same direction, counter-currently in substantially opposite directions). In some cases, at least a portion of the solid in the first fluid is dissolved by the solvent in the second fluid upon contacting the first and second fluids.

Figure 4A:
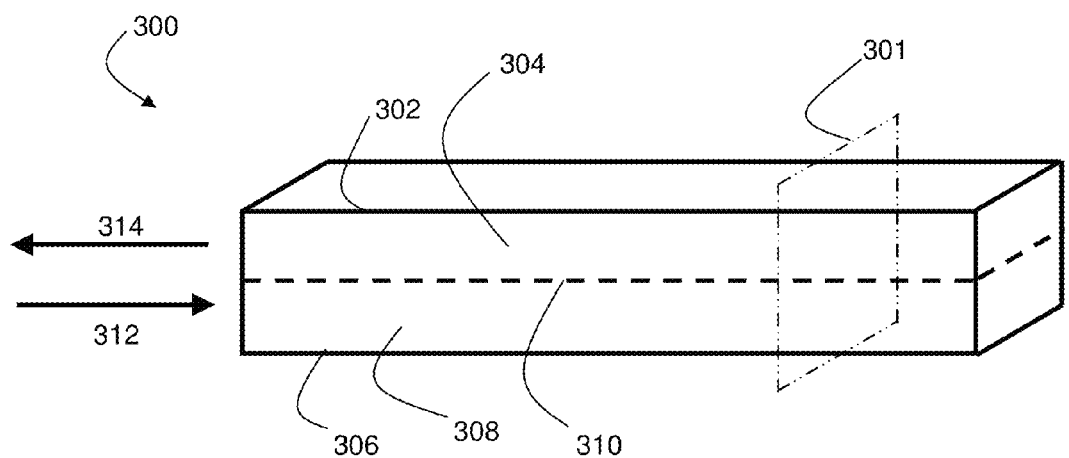
FIGS. 4A-4D include exemplary schematic illustrations of microfluidic systems employing porous structures.
Figure 4B:
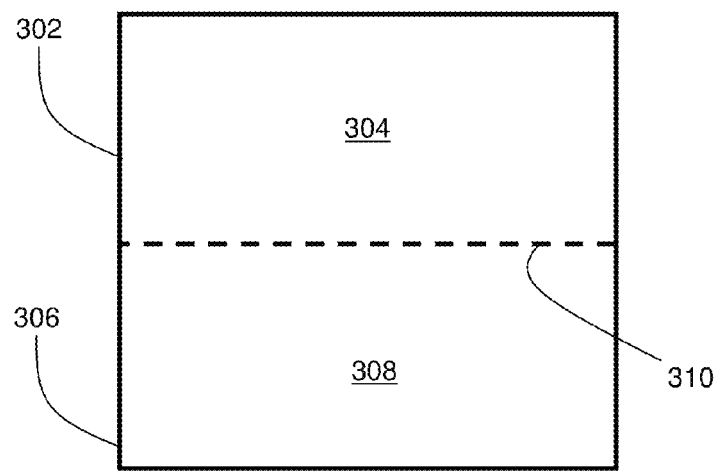

FIG. 4A includes a schematic illustration of a system that employs a porous structure through which fluids in a first and second microfluidic channel are connected. FIG. 4B includes a cross-sectional schematic of the system illustrated in FIG. 4A as defined by plane 301. In the set of embodiments illustrated in FIG. 4A, system 300 includes a first microfluidic channel 302 containing a first fluid 304 containing a solid. In addition, system 300 includes a second microfluidic channel 306 containing a fluid 308 comprising a solvent. The first and second microfluidic channels are in fluid communication via porous structure 310 (e.g., a membrane, a porous wall, and the like). In some embodiments, fluids 304 and 308 are flowed in substantially the same direction (e.g., in the direction of arrow 312). In some cases, fluids 304 and 308 can be flowed in opposite directions (e.g., one in the direction of arrow 312, and the other in the direction of arrow 314). In some cases, at least a portion of the solid within fluid 304 is dissolved by the solvent in second fluid 308 upon contacting the first and second fluids. In some cases, the first and second fluid can be contacted within the pores of the porous structure. In some embodiments, a portion of the solids in first fluid 304 may traverse the porous structure and interact with the solvent in microfluidic channel 306. In some cases, a portion of the solvent in second fluid 308 may traverse the porous structure and interact with the solids in microfluidic channel 302.

Any suitable porous structure may be used in the embodiments described herein. In some embodiments, the pores within the porous structure can comprise substantially straight through-holes that connect the first and second microfluidic channels. In some cases, the porous structure can comprise an interconnected network of pores that connects the first and second microfluidic channels. Exemplary porous structures include membranes, porous walls (e.g., fabricated from the same or different materials as the walls of the microfluidic channels), and the like. In some embodiments, the size of the pores and/or the percentage of void space within the porous structure can be selected such that a desired rate of transport of the solvent, solids, and/or solid carrier fluid from one channel to the other can be achieved.

Figure 4C:
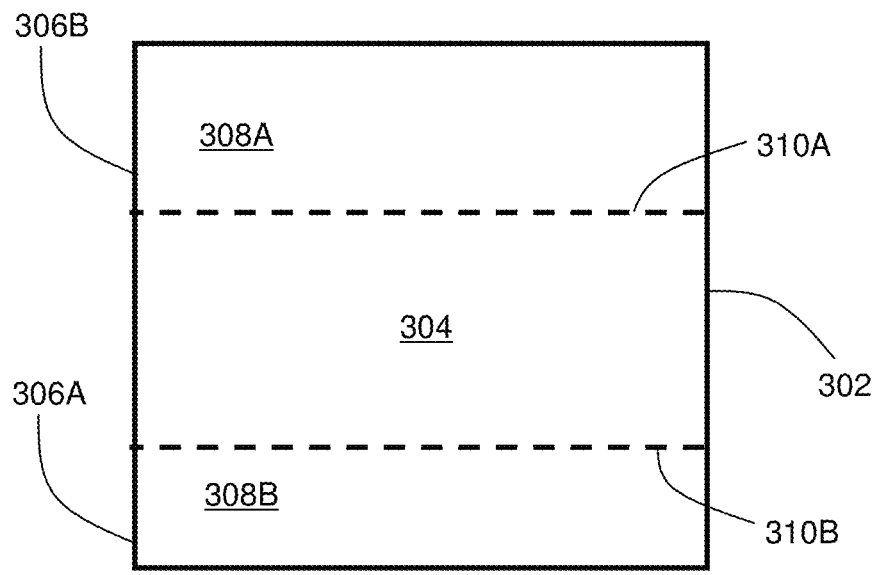

In some embodiments, porous structures can be used in association with three or more microfluidic channels. For example, FIG. 4C illustrates an embodiments in which channels 306A and 306B are in fluid communication with channel 304 via porous structures 310A and 310B, respectively. In the set of embodiments illustrated in FIG. 4C, fluid 304 contains solids while fluids 308A and 308B contain one or more solvents. However, in other cases, one or more solvents can be contained within the inner fluid while solids are contained within the outer fluids.

Figure 4D:
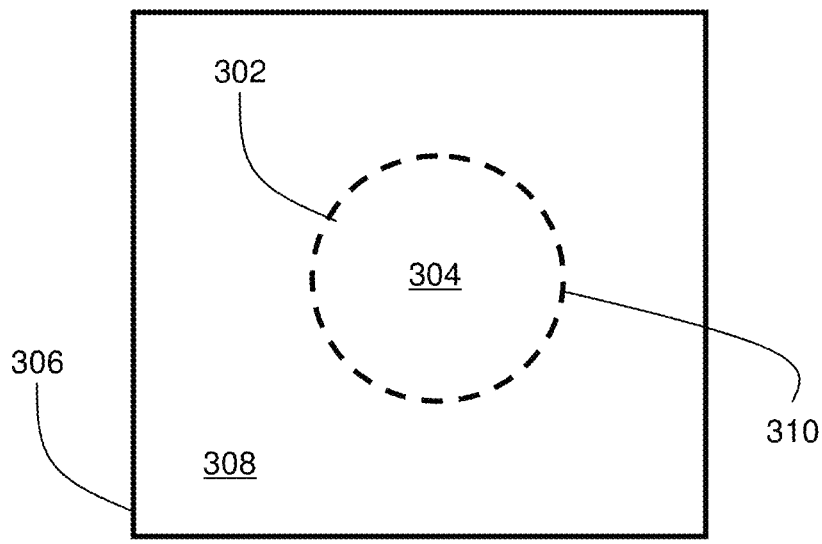

In addition, the porous structures can be arranged in any suitable configuration. For example, the set of embodiments illustrated in the cross-sectional schematic in FIG. 4D includes microfluidic channel 302 disposed within microfluidic channel 306, wherein channels 302 and 306 are in fluid communication via porous structure 310 arranged as a cylinder. While FIG. 4D illustrates a set of embodiments in which inner fluid 304 contains solids and outer fluid 308 contains solvent, the opposite arrangement can also be used (i.e., solids within the outer fluid and solvent within the inner fluid) in some embodiments.

While the addition of solvents to at least partially dissolve a solid within a microfluidic system has been described, it should be understood that, in some embodiments, a diluting fluid can be added to the microfluidic channel (e.g., via inlets 212 and 216 in FIGS. 3A-3B, through porous structure 310 in FIGS. 4A-4D, etc.) in addition to or in place of the solvent. Addition of a diluting fluid can, for example, inhibit the growth and/or formation of a solid particle (e.g., inhibit crystal growth and/or nucleation, inhibit precipitation and/or growth of an amorphous solid, etc.) by decreasing the concentration of the solid precursor in the fluid within the microfluidic channel. Systems and methods for controlling the growth of crystals and other solid particles are described, for example, in U.S. patent application Ser. No. 12/468,365, entitled "Systems and Methods for Microfluidic Crystallization," to Sultana, et. al., filed on May 19, 2009, which is incorporated herein by reference in its entirety for all purposes.

In some embodiments, the size and/or geometry of the microfluidic channel through which solids are flowed can be selected to reduce accumulation of solids. For example, microfluidic channels that include gradual turns (as opposed to sharp turns) can be useful in limiting solid accumulation. Not wishing to be bound by any theory, the gradual turns may ensure that, as a solid particle enters a turn, its momentum does not carry it across the laminar flow stream such that it contacts a wall. By keeping the solid particles away from the walls, accumulation at the walls (e.g., via bridging of particles) can be inhibited. In some embodiments, the microfluidic channel is formed such that the direction of fluid flow within the channel changes (e.g., due to at least one turn in the microfluidic channel) at least 360 degrees. Using microfluidic channels with turns, as opposed to substantially straight channels, allows one to increase the distance over which the fluid travels while reducing the area occupied by the device. In some embodiments, the radius of curvature along substantially all of the length of the microfluidic channel in which solids flow is at least about 10 mm. In some cases, the radius of curvature along substantially all of the length of the microfluidic channel in which solids flow is at least about 25 times the minimum cross-sectional dimension of the channel portion through which solids flow. In this context, the minimum cross-sectional dimension of the channel portion through which solids are flowed is measured in a direction perpendicular to fluid flow, and is calculated as the minimum distance that intersects the center of a cross-section of the microfluidic channel and is bounded by the walls of the microfluidic channel.

In some embodiments, the cross-sectional size of the microfluidic channel can be chosen such that accumulation of solids is inhibited. Channels with relatively short cross-sectional dimensions can include short distances over which a solid particle must travel to reach a channel wall and/or another solid particle. In some embodiments, the minimum cross-sectional dimension of the portion of the microfluidic channel through which solids are transported is at least about 10, at least about 50, at least about 100, between about 10 and about 100 times the average of the largest dimensions of the solid particles within the microfluidic channel. In this context, the minimum cross-sectional dimension of the portion of the channel through which solids are flowed is measured in a direction perpendicular to fluid flow, and is calculated as the minimum distance that intersects the center of a cross-section of the microfluidic channel and is bound by the walls of the microfluidic channel. In addition, in this context, the largest dimension of a solid particle is measured along the longest line that can be drawn between two exterior points of a solid particle. The average of the largest dimensions of a plurality of entities (e.g., solid particles) is calculated as a number average.

In some cases, the systems and methods described herein can be controlled by a control system. For example, the flow of fluid within one or more microfluidic channels can be controlled by a control system in some cases. In some instances, a first property or first condition within the system can be determined, and a second property or second condition within the system (which may be the same as, or different than the first property or first condition) can be adjusted based upon the first determination step. Determining can include, in some embodiments, the analysis or measurement of a species (e.g., a solid particle, a precursor to a solid, a fluid, an impurity etc.), a property (e.g., a dimension, crystallographic orientation, morphology, etc.), or condition (e.g., pressure drop across a microfluidic channel, flow rate, temperature, pH, evaporation rate, etc.), for example, quantitatively or qualitatively, and/or the detection of the presence or absence of the species, property, or condition. For example, in one set of embodiments, the pressure drop along the microfluidic channel may be measured and, once the pressure drop exceeds a threshold value, a solvent may be added to the microfluidic channel (e.g., to dissolve a solid clogging the channel). As another example, the microfluidic channel may be monitored using a camera and, upon formation of a blockage in the microfluidic channel, a solvent may be added (e.g., from the upstream solvent channel closest to the blockage) such that at least a portion of the solid causing the blockage is dissolved. As yet another example, determining can comprise measuring the effect of a change in a channel dimension on the amount of solid that agglomerates within the microfluidic channel. In some embodiments, one or more flushing cycles may be conducted within the microfluidic channel. For example, solids may be passed through the channel, and a fluid (e.g., water, an alcohol, or any suitable flushing fluid) may be passed through the channel to remove unwanted material. In some cases, the flushing cycle can be controlled by the controller system. In some embodiments, solids can be flowed through the microfluidic channel substantially continuously, without the need for one or more flushing cycles.

Examples of suitable determination techniques include, but are not limited to, spectroscopy such as infrared, absorption, fluorescence, UV/visible, FTIR ("Fourier Transform Infrared Spectroscopy"), or Raman; gravimetric techniques; ellipsometry; piezoelectric measurements; immunoassays; electrochemical measurements; optical measurements such as optical microscopy or optical density measurements; circular dichroism; light scattering measurements such as quasielectric light scattering; polarimetry; refractometry; or turbidity measurements. In some embodiments, at least a portion of the device in which solids are transported is transparent to at least one wavelength of electromagnetic radiation (e.g., x-rays, ultraviolet, visible, IR, etc.) allowing interrogation of, for example, a solid, the channel, the fluid, etc. For example, optical microscopy may be used to determine one or more solid properties such as a dimension, shape, the presence or absence of the solid, etc. The systems used to determine a property of the solids may be interfaced with a computer to allow for real-time analysis. For example, images of solids may be analyzed in real time using image analysis software. This may allow for on board real-time determination of, for example, reaction kinetics, which may be used in subsequent reaction runs to optimize the solid-formation process. In addition, real time analysis may allow integration of feedback control loop, enabling one to achieve solids with the desired property (e.g. size, size distribution, morphology, morphologic distribution, etc.).

In some embodiments, the concentration of solids within the primary fluidic channel is maintained within a range. In some cases, the concentration of the solid within the primary microfluidic channel is maintained between about 0.01 vol % and about 10 vol %, or between about 0.01 vol % and about 1 vol %.

The systems and methods described herein can be used with a variety of crystal types and crystal precursors. A "crystal precursor" refers to any species that forms on a crystal (e.g., to achieve crystal growth) upon combination with the crystal. In some embodiments, a solid crystal may comprise one material, while a crystal precursor comprises another material (e.g., as in heterogeneous crystal growth). In some cases, solid crystals may be of one morphology, while the crystal precursor, which comprises the same material as the solid crystal, forms another morphology on top of the solid due to one or more conditions in which growth occurs. In some embodiments, the solid crystals are nucleated forms of the crystal precursor contained in one or more of the fluids fed to a microfluidic channel. Solid crystals can include a single species or multiple species (e.g., a co-crystal). In some cases, the crystal seeds may be substantially organic, substantially inorganic, or a co-crystal of at least one organic and at least one inorganic species. In some cases, the crystal precursor may comprise a substantially similar material as the crystal on which it is formed. Crystal precursors may be, for example, suspended (e.g., proteins) or dissolved (e.g., ions) in a fluid. Crystal precursors may be organic or inorganic.

Examples of materials suitable for use as solid crystals or crystal precursors include, but are not limited to pharmaceuticals (e.g. ibuprofen, celcoxib, rofecoxib, valdecoxib, naproxen, meloxicam, aspirin, diclofenac, hydrocodone, propoxyphene, oxycodone, codeine, tramadol, fentanyl, morphine, meperidine, cyclobenzaprine, carisoprodol, metaxalone, chlorpheniramine, promethazine, methocarbamol, gabapentin, clonazepam, valproic acid, phenytoin, diazepam, topiramate, sumatriptan, lamotrigine, oxcarbanepine, phenobarbital, sertraline, paroxetine, fluoxetine, venlafaxine, citalopram, bupropion, amitriptyline, escitalopram, trazodone, mirtanapine, zolpidem, risperidone, olanzapine, quetiapine, promethazine, meclizine, metoclopramide, hydroxyzine, zaleplon, alprazolam, lorazepam, amphetamine, methylphenidate, temazepam, donepexil, atomoxetine, buspirone, lithium carbonate, carbidopa, amoxicillin, cephalexin, penicillin, cefdinir, cefprozil, cefuroxime, ceftriaxone, vancomycin, clindamycin, azithromycin, ciprofloxacin, levofloxacin, trimethoprim, clarithromycin, nitrofurantoin, doxycycline, moxifloxicin, gatifloxacin, tetracycline, erythromycin, fluconazole, valacyclovir, terbinafine, metronidazole, acyclovir, amphotericin, metformin, glipizide, pioglitazone, glyburide, rosiglitazone, glimepiride, metformin, octreotide, glucagon, insulin, human insulin NPH, glargine (insulin), lispro (insulin), aspart (insulin), levothyroxine, prednisone, allopurinol, methylprednisolone, liothyronine, somatropin, colchicine, sulfamerazine, lovastatin, caffeine, cholesterol, lidocaine, strimasterol, theophyllin, acetaminophen, albumin, sporanic acid, lysozyme, mefenamic acid, paracetamol, salmeterol xinafoate, salbutamol, tetracycline or derivatives or parents of the above-mentioned compounds), protein drugs (e.g. interferon, leuprolide, infliximab, trastuzumab, filgastrim, goserelin etc.) pigments (e.g., bronze red, quinacridone etc.), small organic molecules (e.g. glycine, glutamic acid, methionine, flufenamic acid etc.), explosives (e.g. cyclotrimetylenetrinitramine, nitroguanidine etc.).

The systems and methods described herein can also be used with a wide variety of amorphous solid particles and amorphous solid precursors. An "amorphous solid precursor" refers to any species that forms an amorphous solid on another solid (e.g., on another amorphous solid, on a crystal). Examples of materials that may form amorphous solids for use in the systems and methods described herein include, but are not limited to barium titania ($BaTiO_3$,) titanium oxide, iron ($\beta$-FeOOH), hydrogoethite ($\alpha$-FeOOH.$xH_2O$), manganese-zinc ferrite, $BaSn(OH)_x$, alumina, zirconia, iron oxide, silica, titania, iron-cobalt, and the like.

As used herein, the term "fluid" generally refers to a substance that tends to flow and to conform to the outline of its container. Typically, fluids are materials that are unable to withstand a static shear stress, and when a shear stress is applied, the fluid experiences a continuing and permanent distortion. The fluid may have any suitable viscosity that permits at least some flow of the fluid. Non-limiting examples of fluids include liquids, gases, and supercritical fluids.

As used herein, two fluids are "immiscible," or not miscible, with each other when one is not soluble in the other to a level of at least 10% by weight at the temperature and over the time scale of the use of the device of the invention.

A "channel," as used herein, means a feature on or in an article (e.g., a substrate) that at least partially directs the flow of a fluid. The channel can have any cross-sectional shape (circular, oval, triangular, irregular, square or rectangular, or the like) and can be covered or uncovered. In embodiments where it is completely covered, at least one portion of the channel can have a cross-section that is completely enclosed, or the entire channel may be completely enclosed along its entire length with the exception of its inlet(s) and outlet(s). A channel may also have an aspect ratio (length to average cross sectional dimension) of at least 2:1, more typically at least 3:1, 5:1, or 10:1 or more. The "cross-sectional dimension" of a channel is measured perpendicular to the direction of fluid flow.

The channel may be of any size, for example, having a largest cross-sectional dimension of less than about 5 mm or 2 mm, or less than about 1 mm, or less than about 500 microns, less than about 200 microns, less than about 100 microns, less than about 60 microns, less than about 50 microns, less than about 40 microns, less than about 30 microns, less than about 25 microns, less than about 10 microns, less than about 3 microns, less than about 1 micron, less than about 300 nm, less than about 100 nm, less than about 30 nm, or less than about 10 nm. In some cases the dimensions of the channel may be chosen such that fluid is able to freely flow through the article or substrate. The dimensions of the channel may also be chosen, for example, to allow a certain volumetric or linear flow rate of fluid in the channel. In some embodiments, the length of the channel may be selected such that the residence times of a first and second (or more) fluids at a predetermined flow rate are sufficient to produce solids of a desired size or morphology. Lengths, widths, depths, or other dimensions of channels may be chosen, in some cases, to produce a desired pressure drop along the length of a channel (e.g., when a fluid of known viscosity will be flowed through one or more channels). Of course, the number of channels and the shape of the channels can be varied by any method known to those of ordinary skill in the art.

In some, but not all embodiments, some or all components of the systems and methods described herein are microfluidic. "Microfluidic," as used herein, refers to a device, apparatus or system including at least one fluid channel having a largest cross-sectional dimension of less than about 1 mm, and a ratio of length to largest cross-sectional dimension perpendicular to the channel of at least 3:1. A "microfluidic channel" or a "microchannel" as used herein, is a channel meeting these criteria. In one set of embodiments, all fluid channels containing embodiments of the invention are microfluidic.

A variety of materials and methods, according to certain aspects of the invention, can be used to form systems such as those described above. In some embodiments, the fluid channels may comprise tubing such as, for example, flexible tubes (e.g., PEEK tubing), capillary tubes (e.g., glass capillary tubes), and the like. In some embodiments, various components can be formed from solid materials, in which microfluidic channels can be formed via micromachining, film deposition processes such as spin coating and chemical vapor deposition, laser fabrication, photolithographic techniques, soft lithographic techniques, etching methods (e.g., etching a substrate) including wet chemical or plasma processes, and the like. See, for example, *Scientific American,* 248:44-55, 1983 (Angell, et al). In one set of embodiments, at least a portion of the fluidic system is formed of silicon by etching features in a silicon chip. Enclosed channels may be formed, for example, by bonding a layer of material (e.g., polymer, Pyrex®, silicon, etc.) over the etched channels in the silicon. Technologies for precise and efficient fabrication of various fluidic systems and devices of the invention from silicon are known by those of ordinary skill in the art. In another embodiment, various components of the systems and devices of the invention can be formed of a polymer, for example, an elastomeric polymer such as polydimethylsiloxane ("PDMS"), polytetrafluoroethylene ("PTFE" or Teflon®) or rigid polymers such as poly(methyl methacrylate) (PMMA), cyclic olefin copolymer (COC) (e.g. TOPAS), or the like. In some cases, various components of the system may be formed in other materials such as metal, ceramic, glass, Pyrex®, etc. In some embodiments, various components of the system may be formed of composites of these materials herein.

Different components can be fabricated of different materials. For example, a base portion including a bottom wall and side walls can be fabricated from a transparent or at least partially transparent material, such as glass or a transparent polymer, for observation and/or control of the fluidic process, and a top portion can be fabricated from an opaque material such as silicon. Components can be coated so as to expose a desired chemical functionality to fluids that contact interior channel walls, where the base supporting material does not have a precise, desired functionality. For example, components can be fabricated as illustrated, with interior channel walls coated with another material. Material used to fabricate various components of the systems and devices of the invention, e.g., materials used to coat interior walls of fluid channels, may desirably be selected from among those materials that will not adversely affect or be affected by fluid flowing through the fluidic system, e.g., material(s) that is chemically inert in the presence of fluids to be used within the device.

In one embodiment, various components of the invention are fabricated from polymeric and/or flexible and/or elastomeric materials, and can be conveniently formed of a hardenable fluid, facilitating fabrication via molding (e.g. replica molding, injection molding, cast molding, etc.). The hardenable fluid can be essentially any fluid that can be induced to solidify, or that spontaneously solidifies, into a solid capable of containing and/or transporting fluids contemplated for use in and with the fluidic network. In one embodiment, the hardenable fluid comprises a polymeric liquid or a liquid polymeric precursor (i.e. a prepolymer). Suitable polymeric liquids can include, for example, thermoplastic polymers, thermoset polymers, or mixture of such polymers heated above their melting point/glass transition temperature. As another example, a suitable polymeric liquid may include a solution of one or more polymers in a suitable solvent, which solution forms a solid polymeric material upon removal of the solvent, for example, by evaporation. Such polymeric materials, which can be solidified from, for example, a melt state or by solvent evaporation, are well known to those of ordinary skill in the art. A variety of polymeric materials, many of which are elastomeric, are suitable, and are also suitable for forming molds or mold masters, for embodiments where one or both of the mold masters is composed of an elastomeric material. A non-limiting list of examples of such polymers includes polymers of the general classes of silicone polymers, epoxy polymers, and acrylate polymers. Epoxy polymers are characterized by the presence of a three-membered cyclic ether group commonly referred to as an epoxy group, 1,2-epoxide, or oxirane. For example, diglycidyl ethers of bisphenol A can be used, in addition to compounds based on aromatic amine, triazine, and cycloaliphatic backbones. Another example includes the well-known Novolac polymers. Non-limiting examples of silicone elastomers suitable for use according to the invention include those formed from precursors including the chlorosilanes such as methylchlorosilanes, ethylchlorosilanes, phenylchlorosilanes, etc.

Silicone polymers can be used in one set of embodiments, for example, the silicone elastomer polydimethylsiloxane. Non-limiting examples of PDMS polymers include those sold under the trademark Sylgard by Dow Chemical Co., Midland, Mich., and particularly Sylgard 182, Sylgard 184, and Sylgard 186. Silicone polymers including PDMS can exhibit beneficial properties that may simplify fabrication of microfluidic structures in some cases. For instance, such materials are inexpensive, readily available, and can be solidified from a prepolymeric liquid via curing with heat. For example, PDMSs are typically curable by exposure of the prepolymeric liquid to temperatures of about, for example, about 65° C. to about 85° C. for exposure times of, for example, about two hours. Also, silicone polymers, such as PDMS, can be elastomeric, and thus may be useful for forming very small features with relatively high aspect ratios, useful in certain embodiments of the invention. Flexible (e.g., elastomeric) molds or masters can be advantageous in this regard.

One advantage of forming structures such as microfluidic structures of the invention from silicone polymers, such as PDMS, is the ability of such polymers to be oxidized, for example by exposure to an oxygen-containing plasma such as an air plasma, so that the oxidized structures contain, at their surface, chemical groups capable of cross-linking to other oxidized silicone polymer surfaces or to the oxidized surfaces of a variety of other polymeric and non-polymeric materials. Thus, components can be fabricated and then oxidized and essentially irreversibly sealed to other silicone polymer surfaces, or to the surfaces of other substrates reactive with the oxidized silicone polymer surfaces, without the need for separate adhesives or other sealing means. In most cases, sealing can be completed simply by contacting an oxidized silicone surface to another surface without the need to apply auxiliary pressure to form the seal. That is, the pre-oxidized silicone surface acts as a contact adhesive against suitable mating surfaces. Specifically, in addition to being irreversibly sealable to itself, oxidized silicone such as oxidized PDMS can also be sealed irreversibly to a range of oxidized materials other than itself including, for example, glass, silicon, silicon oxide, quartz, silicon nitride, polyethylene, polystyrene, glassy carbon, and epoxy polymers, which have been oxidized in a similar fashion to the PDMS surface (for example, via exposure to an oxygen-containing plasma). Oxidation and sealing methods useful in certain embodiments, as well as overall molding techniques, are described in the art, for example, in an article entitled "Rapid Prototyping of Microfluidic Systems and Polydimethylsiloxane," Anal. Chem., 70:474-480, 1998 (Duffy, et al.), incorporated herein by reference.

In some embodiments, certain microfluidic structures of the invention (or interior, fluid-contacting surfaces) may be formed from certain oxidized silicone polymers. Such surfaces may be more hydrophilic than the surface of an elastomeric polymer. Such hydrophilic channel surfaces can thus be more easily filled and wetted with aqueous solutions.

In one embodiment, a bottom wall of a microfluidic device of the invention is formed of a material different from one or more side walls or a top wall, or other components. For example, the interior surface of a bottom wall can comprise the surface of a silicon wafer or microchip, or other substrate. Other components can, as described above, be sealed to such alternative substrates. Where it is desired to seal a component comprising a silicone polymer (e.g. PDMS) to a substrate (bottom wall) of different material, the substrate may be selected from the group of materials to which oxidized silicone polymer is able to irreversibly seal (e.g., glass, silicon, silicon oxide, quartz, silicon nitride, polyethylene, polystyrene, epoxy polymers, and glassy carbon surfaces which have been oxidized). Alternatively, other sealing techniques can be used, as would be apparent to those of ordinary skill in the art, including, but not limited to, the use of separate adhesives, bonding, solvent bonding, ultrasonic welding, etc.

The following patents and applications are incorporated herein by reference in their entirety for all purposes: U.S. Provisional Patent Application No. 61/258,767, filed Nov. 6, 2009, and entitled "Systems and Methods for Handling Solids in Microfluidic Systems." All other patents and patent applications mentioned herein are also incorporated herein by reference in their entirety for all purposes.

EXAMPLES

The following examples are intended to illustrate certain embodiments of the present invention, but do not exemplify the full scope of the invention.

Example 1

Figure 5:
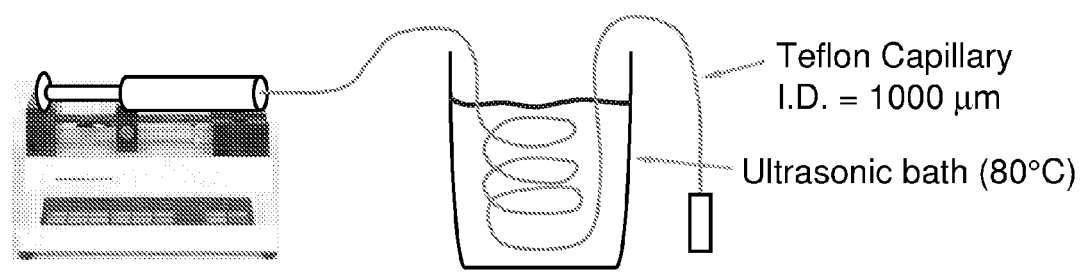
FIG. 5 includes a schematic diagram of a system in which acoustic energy is applied to a microfluidic channel, according to one set of embodiments.
Figure 6:
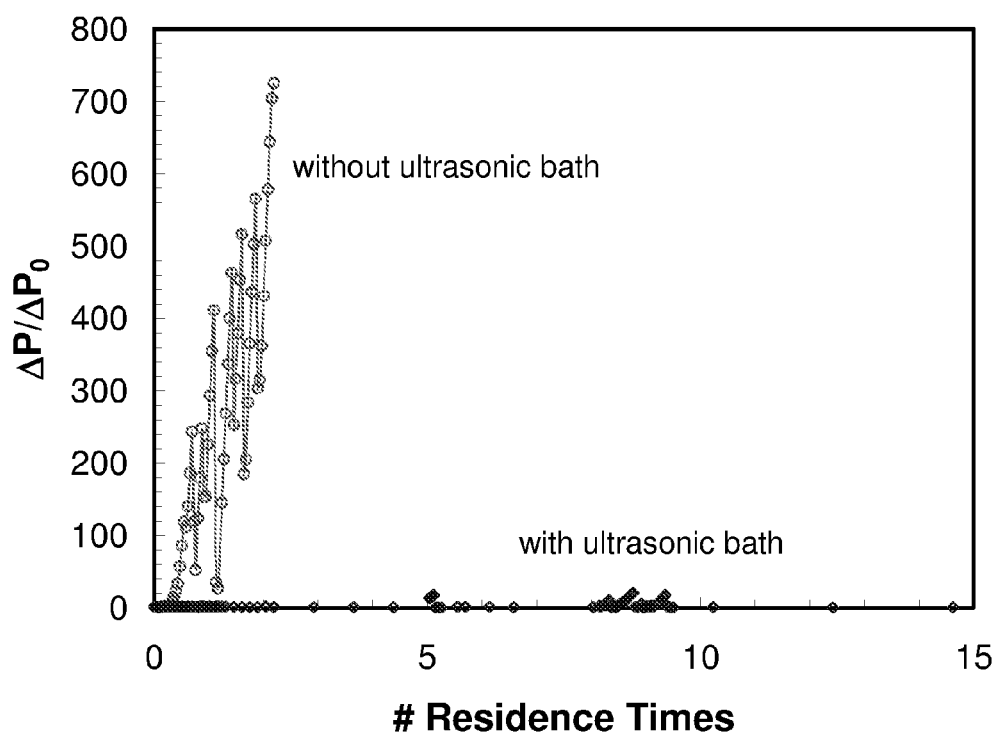
FIG. 6 includes a plot of the pressure drop along a channel as a function of time as measured as a multiple of residence time, according to one set of embodiments.

This example describes one set of embodiments in which auxiliary acoustic energy was applied to a microfluidic channel to inhibit the accumulation of solids within the channel. A feed of 0.1 M aniline, 0.1 M 4-methoxychlorobenzene, 0.1 M sodium tert-butoxide, and palladium pre-catalysts in 1,4-dioxane was delivered at 35 µL/min to a Teflon capillary, as shown in FIG. 5. The product of this reaction was 4-methoxy-N-phenylaniline. A by-product of this reaction is sodium chloride, which is insoluble in 1,4-dioxane, the reaction solvent. When no acoustic energy was applied, the pressure drop across the capillary increased by two orders of magnitude within only two residence times, as shown in FIG. 6. This eventually resulted in clogging of the capillary reactor. The same experiment was repeated with the ultrasonic bath turned on. The frequency was measured from the acoustic transmitter and found to cycle from 2.95 Hz to 41.7 kHz. The voltage amplitude ranged from +/−200 to +/−400 V. The presence of acoustic energy prevented clogging, as the pressure drop remained negligible over 15 residence times.

Table 1 illustrates that the maximum particle size did not significantly change with residence time (from 1 to 4 min) when the acoustic energy was applied. However, when the ultrasonic bath was turned off, the solid particles were an order of magnitude larger, which in turn led to clogging of the channel.

TABLE 1

Maximum particle sizes produced for different residence times with and without the application of acoustic energy. Particle sizes were determined using laser diffraction.

| Maximum Particle Size (µm) | Residence time (min) | Acoustic energy? |
|---|---|---|
| 8.4 | 1 | Yes |
| 6.3 | 2 | Yes |
| 11.2 | 4 | Yes |
| 200 | 4 | No |

Example 2

Figure 7:
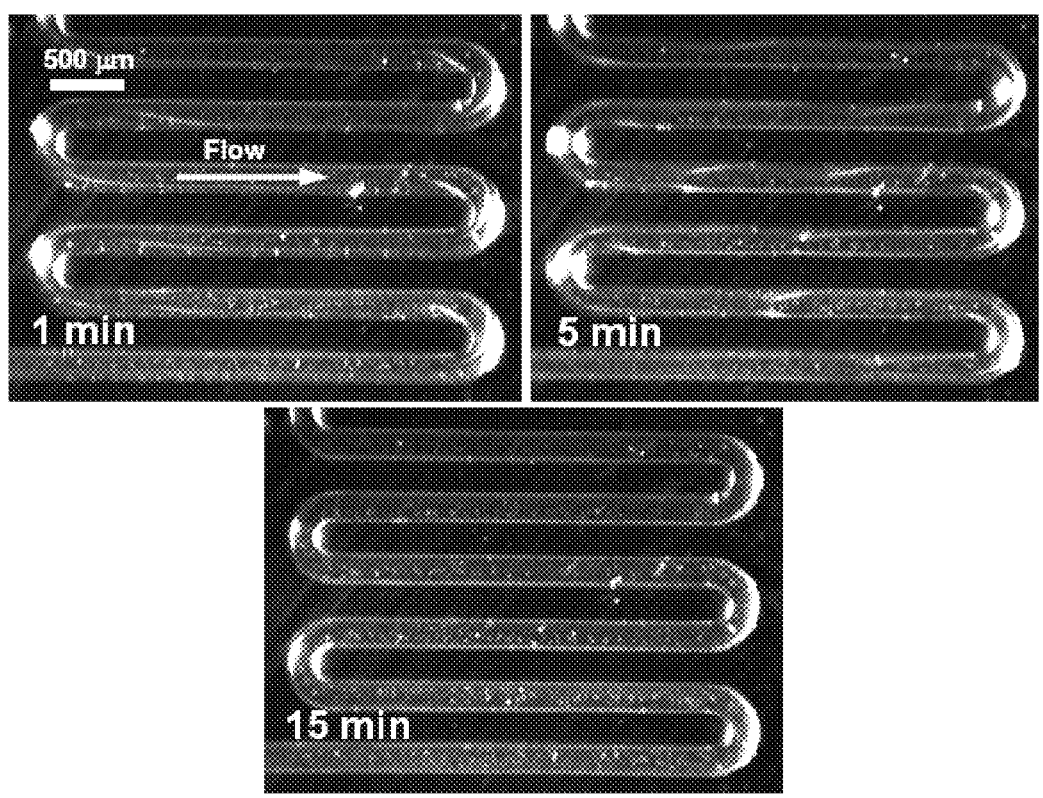
FIG. 7 includes magnified photographs of microfluidic channels, according to one set of embodiments.

This example describes the modification of the interior surface of a microfluidic channel to inhibit solid accumulation within the channel. As shown in FIG. 7, core-sheath flow was established within a microfluidic channel by co-flowing a nitrogen gas core with a liquid sheath. The liquid sheath included Teflon AF 1600 dissolved in a fluoropolymer solvent (FC-75 manufactured by 3M). The microfluidic channels were coated with Teflon AF by evaporation of fluoropolymer solvent. Removal of the solvent brought about the deposition of fluoropolymer on the walls of the microfluidic channel. The multiphase flow was useful in maintaining precise control over mass transport between the immiscible phases.

Liquid Teflon AF was first injected into a microfluidic channel (at 30 microL/min). Upon injecting one residence volume of liquid, nitrogen gas was delivered to the microfluidic channel (1 min). The wetting nature of the microfluidic channel resulted in liquid fluoropolymer flowing along the wall, whereas gas flow took place in the center of the channel. This annular-type flow enabled micro-evaporation of the solvent from the wall layer, which in turn increased the apparent liquid viscosity. Increasing the gas flow rate lead to the shearing of liquid along the wall as shown by the waves formed in the sequence of photographs after 5 min. Prolonged exposure to the gas flow produced a thin, smooth fluoropolymer coating on channel surfaces, which generally took on a form of the channel geometry.

Most of the fluoropolymer solvent was evaporated by flowing nitrogen under ambient temperature for 4 hours. The remaining solvent was removed by heating the microfluidic channel above the solvent boiling point (i.e., to a temperature greater than about 112° C.). The solvent was evaporated as fresh nitrogen gas was flowed continuously over the channel surfaces for 4 more hours. In order to promote adhesion of the film to the microreactor walls, the temperature was increased to above the glass transition temperature of the polymer (i.e., 165° C.) and held constant for 1 hour. The entire process was repeated two more times in order to ensure all channel surfaces had been coated.

In another set of experiments, a layer of silicon oxide was grown on the interior surface of a microfluidic channel by heating the silicon substrate in which the channel was formed in the presence of oxygen.

Figure 8:
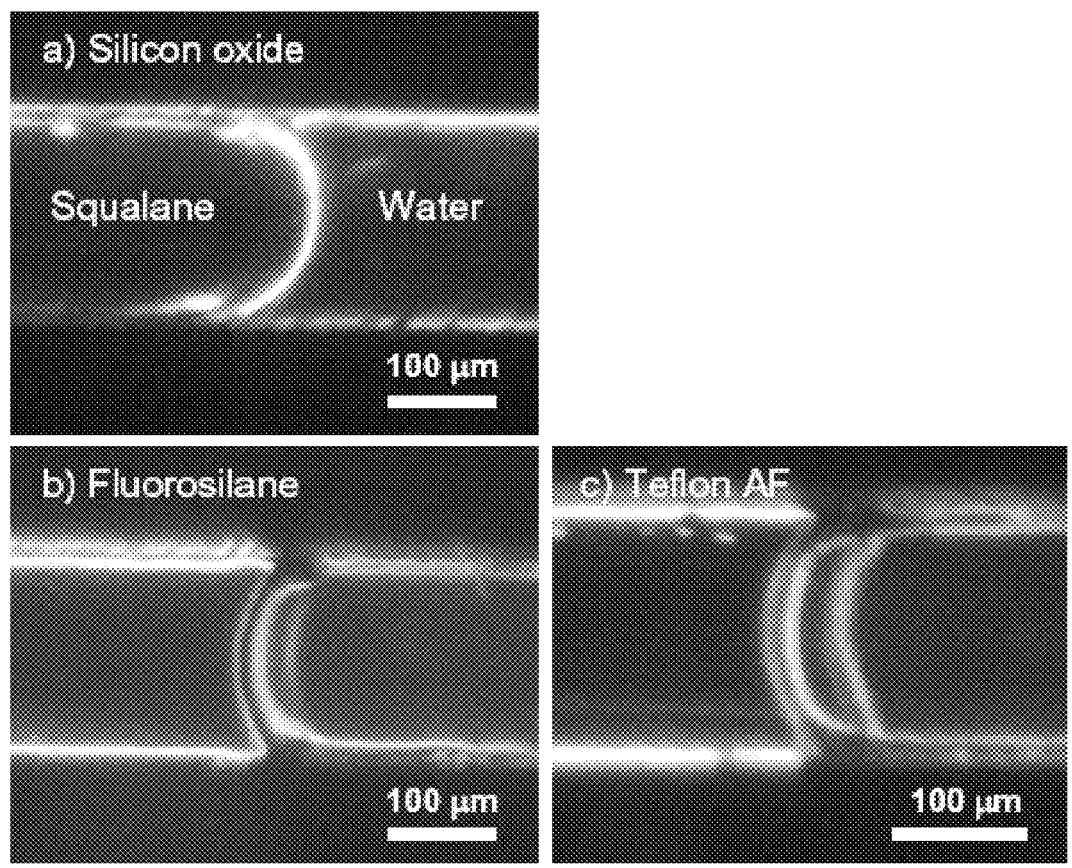
FIGS. 8A-8C include magnified photographs of coated microfluidic channels, according to one set of embodiments.

FIGS. 8A-8C include photographs (under magnification) of microfluidic channels coated with silicon oxide, fluorosilane, and Teflon AF, respectively. As shown in these figures, the wetting behavior of the microfluidic channels coated with fluorosilane and fluoropolymer was the opposite of that observed in the channel coated with silicon oxide. Table 2 illustrates that the contact angle was reversed from hydrophilic to hydrophobic, demonstrating a change in surface chemistry. Several experiments were run for each surface type, and the average measurement (as well as the standard deviation) is reported in Table 2 below.

TABLE 2

Contact angle measurements for silicon oxide, fluorosilane, and fluoropolymer coated microfluidic channels.

| Surface Type | Contact Angle (degrees) | +/−standard deviation |
|---|---|---|
| Silicon oxide | 41 | 6 |
| 1H,1H,2H,2H-perfluorodecyltrichlorosilane | 114 | 4 |
| Teflon AF (1600) | 121 | 3 |

Example 3

Figure 9:
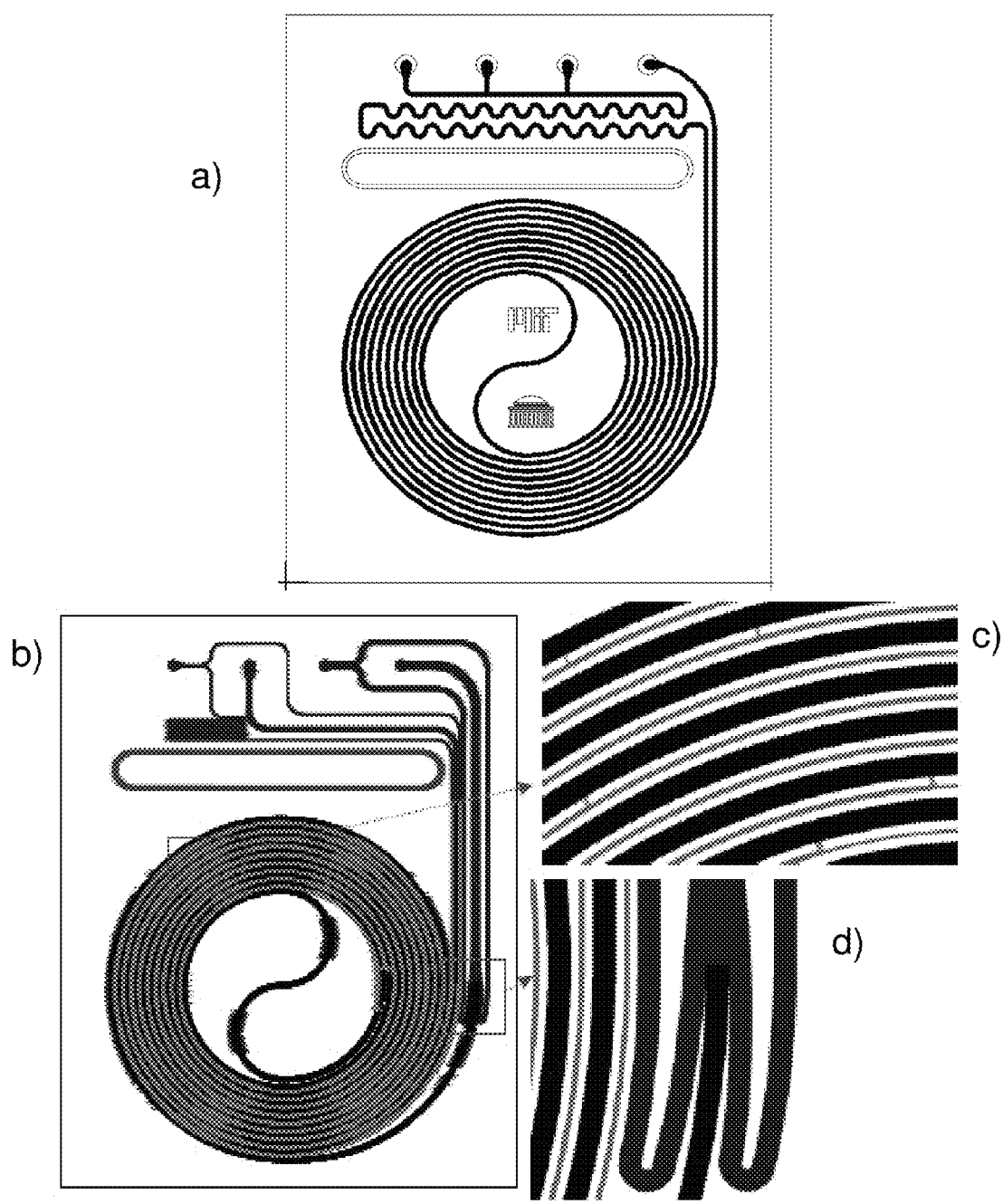
FIGS. 9A-9D include schematic diagrams of channel layouts for microfluidic systems, according to one set of embodiments.

This example describes the fabrication of a device including microfluidic channels with a relatively large radius of curvature along its length. FIGS. 9A-9D include schematic diagrams of reactors fabricated in this example. FIG. 9A includes a microfluidic channel with gradual turns using spiral geometry.

FIG. 9B includes a schematic of a device including a microfluidic channel with multiple inlets along its length. FIG. 9C includes a close-up view of the inlets along the length of the main microfluidic channel. This reactor can be used to add reagents (e.g., solvents) sequentially at various points along the length of the channel. In addition, the reactor design shown in this schematic includes a quench stream at the outlet of the reactor that can be used to dissolve solids formed during reaction.

Solids were flowed through each of the reactors types shown in FIGS. 9A-9D. Solids particles were observed flowing throughout the entire length of the reaction channels.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
    establishing a flow of a first fluid containing a solid in a first microfluidic channel such that the first fluid is flowing in a first direction;
    establishing a flow of a second fluid containing a solvent in a second microfluidic channel wherein:
        the second fluid is flowing in a second direction substantially parallel to the first direction, and
        the first and second microfluidic channels are in fluid communication via a porous structure; and
    contacting the first and second fluids such that the solvent dissolves at least a portion of the solid.

2. A method as in claim 1, wherein establishing the flow of the first fluid containing the solid in the first microfluidic channel comprises feeding the first fluid containing the solid to the first microfluidic channel.

3. A method as in claim 1, wherein establishing the flow of the first fluid containing the solid in the first microfluidic channel comprises establishing the flow of the first fluid containing a precursor of the solid in the first microfluidic channel, and forming the solid from the precursor in the first microfluidic channel.

4. A method as in claim 1, wherein:
    the first microfluidic channel is formed such that the direction of fluid flow within the first microfluidic channel changes at least 360 degrees, and
    the radius of curvature along all of the length of the first microfluidic channel in which solids flow is at least about 10 mm.

5. A method as in claim 1, wherein:
    the first microfluidic channel is formed such that the direction of fluid flow within the first microfluidic channel changes at least 360 degrees, and
    the radius of curvature along all of the length of the first microfluidic channel in which solids flow is at least about 25 times the average cross sectional dimension of the first microfluidic channel portion through which solids flow.

6. A method as in claim 1, wherein at least a portion of the first microfluidic channel is coated with a coating material that inhibits solid accumulation in the first microfluidic channel, relative to an amount of solid accumulation that would be present in the absence of the coating material, but under otherwise identical conditions.

7. A method as in claim 1, wherein a concentration of the solid within the first microfluidic channel is maintained between about 0.01 vol % and about 10 vol %.

8. A method as in claim 1, wherein the minimum cross-sectional dimension of the portion of the first microfluidic channel through which solids are transported is at least about 10 times the average of the largest dimensions of the solid particles within the first microfluidic channel.

9. A method as in claim 1, wherein the flow of fluid is automated.

10. A method as in claim 1, wherein the solid in the first microfluidic channel includes less than 50 wt % of polymeric material.

11. A method as in claim 3, wherein the molecular weight of the solid remains unchanged once the solid is formed.

12. A method as in claim 1, wherein the first microfluidic channel and the second microfluidic channel are arranged side by side.

13. A method as in claim 12, wherein the porous structure forms at least a portion of a wall of the first microfluidic channel and at least a portion of a wall of the second microfluidic channel.

14. A method as in claim 1, wherein at least a portion of the solids in the first fluid traverses the porous structure and interacts with the solvent in the second fluid.

15. A method as in claim 1, wherein at least a portion of the solvent in the second fluid traverses the porous structure and interacts with the solids in the first fluid.

16. A method of inhibiting solid accumulation in a microfluidic channel, comprising:
    establishing a flow of a solid carrier fluid containing a solid in a microfluidic channel;
    flowing a first fluid containing a first solvent in which the solid is soluble into the microfluidic channel at a first feed inlet; and
    flowing a second fluid containing a second solvent in which the solid is soluble into the microfluidic channel at a second feed inlet downstream of the first feed inlet,
    wherein each of the first and second solvents dissolves at least a portion of the solid in the microfluidic channel.

17. A method as in claim 16, wherein inhibiting solid accumulation in the microfluidic channel involves reducing an amount of solid accumulation in the microfluidic channel.

18. A method as in claim 16, wherein inhibiting solid accumulation in the microfluidic channel involves eliminating an amount of solid accumulation in the microfluidic channel.

19. A method as in claim 16, wherein establishing the flow of the solid carrier fluid containing the solid in the microfluidic channel comprises feeding the solid carrier fluid containing the solid to the microfluidic channel.

20. A method as in claim 16, wherein establishing the flow of the solid carrier fluid containing the solid in the microfluidic channel comprises establishing the flow of the solid carrier fluid containing a precursor of the solid in the microfluidic channel, and forming the solid from the precursor in the microfluidic channel.

21. A method as in claim 16, wherein at least a portion of the microfluidic channel is coated with a coating material that inhibits solid accumulation in the microfluidic channel, relative to an amount of solid accumulation that would be present in the absence of the coating material, but under otherwise identical conditions.

22. A method as in claim 16, wherein the concentration of the solid within the microfluidic channel is maintained between about 0.01 vol % and about 10 vol %.

23. A method as in claim 16, wherein the minimum cross-sectional dimension of the portion of the microfluidic channel through which solids are transported is at least about 10 times the average of the largest dimensions of the solid particles within the microfluidic channel.

24. A method as in claim 16, wherein the flow of fluid is automated.

25. A method as in claim 16, wherein the solids in the microfluidic channel include less than about 50 wt % of polymeric material.

26. A method as in claim 20, wherein the molecular weight of the solid remains unchanged once the solid is formed.

* * * * *